(12) United States Patent
Yang et al.

(10) Patent No.: US 12,126,262 B2
(45) Date of Patent: Oct. 22, 2024

(54) DUAL-PHASE CONSTANT ON-TIME POWER CONVERTER AND CONTROL METHOD

(71) Applicant: M3 Technology Inc., Taipei (TW)

(72) Inventors: Bo Yang, Allen, TX (US); Xiaoyu Xi, Dallas, TX (US); David Meng, Los Altos, CA (US)

(73) Assignee: M3 Technology Inc., Taipei (TW)

( * ) Notice: Subject to any disclaimer, the term of this patent is extended or adjusted under 35 U.S.C. 154(b) by 0 days.

(21) Appl. No.: 18/530,177

(22) Filed: Dec. 5, 2023

(65) Prior Publication Data

US 2024/0120841 A1    Apr. 11, 2024

Related U.S. Application Data

(63) Continuation of application No. 17/498,866, filed on Oct. 12, 2021, now Pat. No. 11,901,821.

(51) Int. Cl.
| | |
|---|---|
| *H02M 3/158* | (2006.01) |
| *H02M 1/00* | (2006.01) |
| *H02M 1/08* | (2006.01) |
| *H02M 3/157* | (2006.01) |

(52) U.S. Cl.
CPC ....... *H02M 3/1586* (2021.05); *H02M 1/0003* (2021.05); *H02M 1/08* (2013.01); *H02M 3/157* (2013.01); *H02M 3/1584* (2013.01)

(58) Field of Classification Search
CPC ............. H02M 3/1584; H02M 3/1586; H02M 1/0003; H02M 1/0025; H02M 3/157; H02M 1/08
See application file for complete search history.

(56) References Cited

U.S. PATENT DOCUMENTS

| 10,476,387 | B1* | 11/2019 | Xi | H02M 3/158 |
| 2019/0074770 | A1* | 3/2019 | Trichy | H02M 3/1584 |
| 2020/0100339 | A1* | 3/2020 | Huang | H02M 3/1584 |

* cited by examiner

*Primary Examiner* — Alex Torres-Rivera
(74) *Attorney, Agent, or Firm* — AP3 Law Firm PLLC

(57) ABSTRACT

An apparatus includes a ramp generator configured to produce a set signal for determining a phase shift between a first phase and a second phase of a power converter, a first phase on-timer configured to produce a first reset signal for determining a turn-on time of a high-side switch of the first phase of the power converter, a second phase on-timer configured to produce a second reset signal for determining a turn-on time of a high-side switch of the second phase of the power converter, and a control logic block configured to generate gate drive signals for the first phase and the second phase of the power converter based on the set signal, the first reset signal and the second reset signal.

20 Claims, 18 Drawing Sheets

DUAL-PHASE CONSTANT ON-TIME POWER CONVERTER AND CONTROL METHOD

PRIORITY CLAIM AND CROSS-REFERENCE

This application is a continuation of U.S. patent application Ser. No. 17/498,866, filed on Oct. 12, 2021, entitled "Dual-Phase Constant On-Time Power Converter and Control Method", which application is hereby incorporated herein by reference.

TECHNICAL FIELD

The present invention relates to a dual-phase power converter, and, in particular embodiments, to a dual-phase constant on-time power converter.

BACKGROUND

As technologies further advance, a variety of computing and mobile devices such as laptops, mobile phones, tablet PCs, digital cameras, MP3 players and/or the like, have become popular. With fast advance in communication, computing and mobile devices, more and more systems need low voltage and high current power supplies with fast transient response. At the same time, low quiescent current is also important for those systems as many of them are powered by batteries. With a high load current (e.g., 20 A) in many applications, multi-phase power converters have many advantageous features in comparison with single-phase converters. For example, multi-phase power converters have lower input/output current ripple, smaller output capacitance and inductance, and fast transient response. Furthermore, the structure of the multi-phase power converters helps spread thermal stress, thereby improving system thermal performance. In order to achieve the advantageous features described above, the gate drive control signals in a multi-phase converter should be phase-shifted evenly so that the load current can be evenly distributed in different phases of the multi-phase converter.

FIG. 1 illustrates a dual-phase current mode control power converter. The dual-phase current mode control power converter 100 comprises a first buck converter and a second buck converter. These two buck converters are connected in parallel between an input power source VIN and an output VOUT. An input capacitor C5 is connected between VIN and ground. Two output capacitors C6 and C7 are connected in parallel between VOUT and ground.

As shown in FIG. 1, the first buck converter comprises switches Q11, Q12 and an inductor L1. Q11 and Q12 are connected in series between VIN and ground. L1 is connected between a common node of Q11 and Q12, and VOUT. The first buck converter may be alternatively referred to as a first phase of the dual-phase current mode control power converter.

The second buck converter comprises switches Q21, Q22 and an inductor L2. Q21 and Q22 are connected in series between VIN and ground. L2 is connected between a common node of Q21 and Q22, and VOUT. The second buck converter may be alternatively referred to as a second phase of the dual-phase current mode control power converter.

The control circuit of the dual-phase current mode control power converter comprises an error amplifier 102, an oscillator 104, a first comparator 117, a second comparator 127, a first current sense amplifier 115, a second current sense amplifier 125, a first latch 116, a second latch 126, a first control logic block 110, a second control logic block 120 and a plurality of drivers 111, 112, 121 and 122.

The oscillator 104 is configured to generate a first clock signal CLK1, a second clock signal CLK2, a first ramp signal RAMP1 and a second ramp signal RAMP2. The signals generated by the oscillator 104 are arranged such that a predetermined phase shift (e.g., 180 degrees) is placed between the two phases of the dual-phase current mode control power converter.

As shown in FIG. 1, the inverting input of the error amplifier 102 is employed to detect the output voltage VOUT through a voltage divider formed by resistors R3 and R4. The signal fed into the inverting input of the error amplifier 102 is denoted as FB. The non-inverting input of the error amplifier 102 is connected to a predetermined reference VREF. The output of the error amplifier 102 is connected to an inverting input of the first comparator 117 and an inverting input of the second comparator 127.

A compensation network is connected between the output of the error amplifier 102 and ground. The compensation network comprises resistor R5, capacitor C3 and capacitor C4. The resistor R5 and the capacitor C3 are connected in series and further connected in parallel with the capacitor C4. The compensation network helps to stabilize the control loop and provide sufficient phase margin, thereby improving the transient response performance of the dual-phase current mode control power converter.

The non-inverting input of the first comparator 117 is configured to receive a sum of a detected current signal ISNS1 and a first ramp signal RAMP1. As shown in FIG. 1, the current flowing through the inductor L1 is detected by a first dc resistance (DCR) current sensing apparatus comprising a resistor R1 and a capacitor C1. The sensed current signal is fed into the non-inverting input of the first comparator 117 through the first current sensing amplifier 115. The first current sensing amplifier 115 is employed to provide a suitable current sensing gain.

The first latch 116 is employed to generate gate drive signals for switches Q11 and Q12, respectively. As shown in FIG. 1, the reset input of the first latch 116 is configured to receive the output signal of the first comparator 117. The set input of the first latch 116 is configured to receive the first clock signal CLK1. The output of the first latch 116 is a first PWM signal.

As shown in FIG. 1, the output of the first latch 116 is fed into the first control logic block 110. The first control logic block 110 is employed to generate a high-side gate drive signal and a low-side gate drive signal based upon the first PWM signal generated by the first latch 116. Furthermore, the first control logic block 110 adds a suitable delay between the high-side gate drive signal and the low-side gate drive signal. As shown in FIG. 1, the high-side gate drive signal is applied to the gate of Q11 through the driver 111. The low-side gate drive signal is applied to the gate of Q12 through the driver 112.

The non-inverting input of the second comparator 127 is configured to receive a sum of a detected current signal ISNS2 and a second ramp signal RAMP2. As shown in FIG. 1, the current flowing through the inductor L2 is detected by a second DCR current sensing apparatus comprising a resistor R2 and a capacitor C2. The sensed current signal is fed into the non-inverting input of the second comparator 127 through the second current sensing amplifier 125. The second current sensing amplifier 125 is employed to provide a suitable current sensing gain.

The second latch 126 is employed to generate gate drive signals for switches Q21 and Q22, respectively. As shown in FIG. 1, the reset input of the second latch 126 is configured to receive the output signal of the second comparator 127. The set input of the second latch 126 is configured to receive the second clock signal CLK2. The output of the second latch 126 is a second PWM signal.

As shown in FIG. 1, the output of the second latch 126 is fed into the second control logic block 120. The second control logic block 120 is employed to generate a high-side gate drive signal and a low-side gate drive signal based upon the second PWM signal generated by the second latch 126. Furthermore, the second control logic block 120 adds a suitable delay between the high-side gate drive signal and the low-side gate drive signal. As shown in FIG. 1, the high-side gate drive signal is applied to the gate of Q21 through the driver 121. The low-side gate drive signal is applied to the gate of Q22 through the driver 122.

In operation, the dual-phase current mode control power converter 100 is controlled by a peak current mode control scheme. The current sharing between the two buck converters is achieved through sharing the error amplifier output signal by the control circuits of these two buck converters.

The dual-phase current mode control power converter 100 has several limits on its performance for many applications. First, because the dual-phase current mode control power converter 100 operates with a fixed switching frequency, the dynamic response of the dual-phase current mode control power converter 100 is limited by many factors (e.g., the clock delay). During a sudden load change, the dual-phase current mode control power converter 100 cannot provide a fast transient response. Second, the dual-phase current mode control power converter 100 relies on the oscillator 104 to ensure a phase shift between the two phases. For applications requiring high efficiency at light load operating conditions, it is hard to implement some efficiency improving control mechanisms (e.g., pulse frequency modulation). Third, the control circuits shown in FIG. 1 are complex. Constant On-Time (COT) control provides fast transient response and low quiescent current for synchronous buck converters. Due to its variable frequency nature, COT is not suitable for controlling multi-phase power converters. For multi-phase converter, current sharing between different phases is an important feature. In particular, it is desirable to share the load current evenly between different phases to reduce thermal stress and improve reliability. It would be desirable to provide an apparatus and/or a method for enabling the dual-phase power converter employing the constant on-time control scheme to provide fast transient response and good current sharing under a variety of operating conditions.

SUMMARY

In accordance with an embodiment, an apparatus comprises a ramp generator configured to produce a set signal for determining a phase shift between a first phase and a second phase of a power converter, a first phase on-timer configured to produce a first reset signal for determining a turn-on time of a high-side switch of the first phase of the power converter, a second phase on-timer configured to produce a second reset signal for determining a turn-on time of a high-side switch of the second phase of the power converter, and a control logic block configured to generate gate drive signals for the first phase and the second phase of the power converter based on the set signal, the first reset signal and the second reset signal.

In accordance with another embodiment, a method comprises generating a ramp for determining a phase shift between a first phase and a second phase of a power converter, generating a plurality of set signals, wherein two adjacent set signals are used to determine an turn-on instant of a high-side switch of the first phase and an turn-on instant of a high-side switch of the second phase of the power converter, respectively, generating a plurality of first reset signals for determining turn-off instants of the high-side switch of the first phase, and generating a plurality of second reset signals for determining turn-off instants of the high-side switch of the second phase.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a dual-phase constant on-time power converter. The invention may also be applied, however, to a variety of power converters. Hereinafter, various embodiments will be explained in detail with reference to the accompanying drawings.

Figure 1:
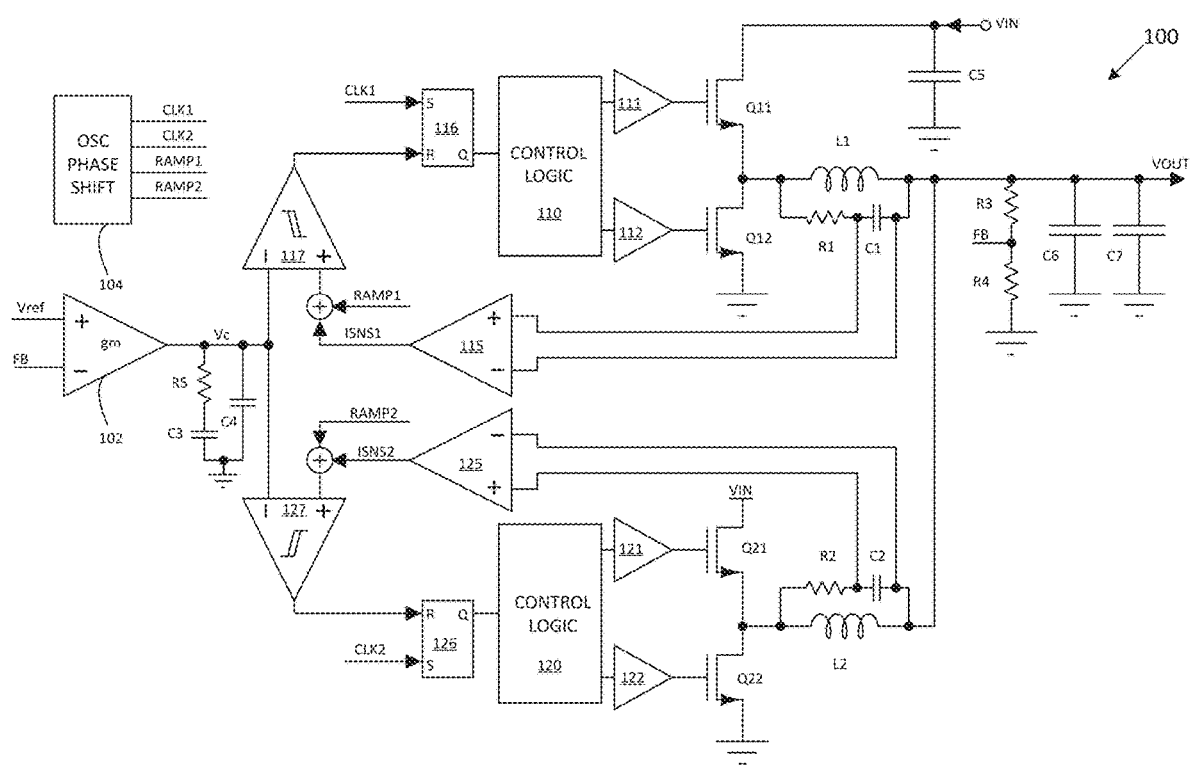
FIG. 1 illustrates a dual-phase current mode control power converter.
Figure 2:
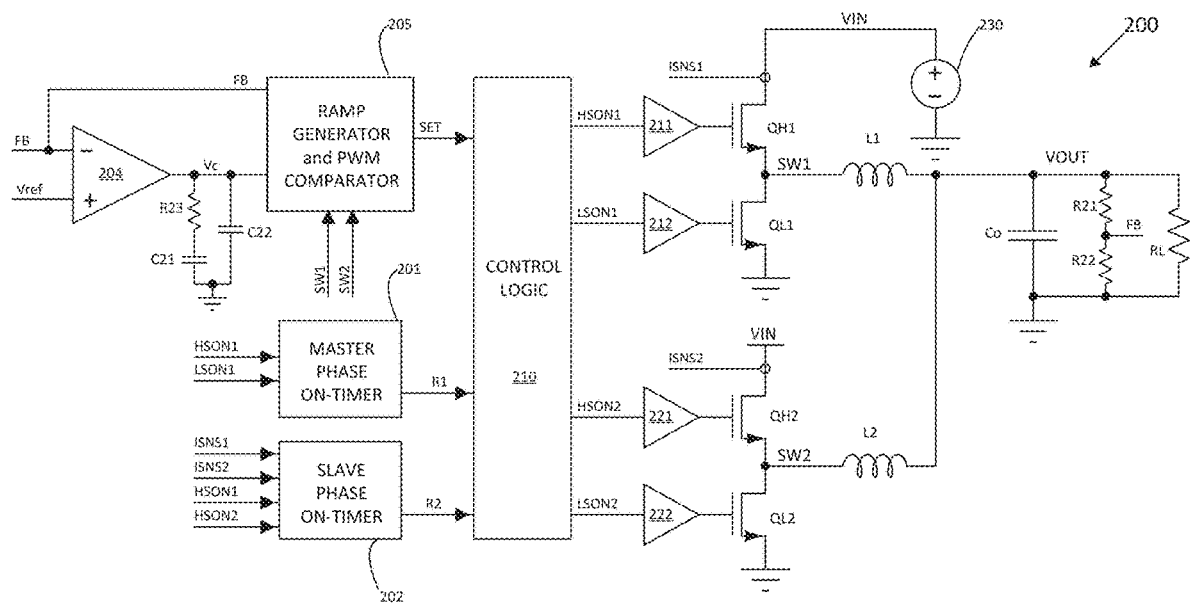
FIG. 2 illustrates a schematic diagram of a dual-phase constant on-time power converter in accordance with various embodiments of the present disclosure.

FIG. 2 illustrates a schematic diagram of a dual-phase constant on-time power converter in accordance with various embodiments of the present disclosure. The dual-phase constant on-time power converter 200 comprises a first buck converter and a second buck converter. The first buck converter is a first step-down converter. The second buck converter is a second step-down converter. These two buck converters are connected in parallel between an input VIN and an output VOUT. A power source 230 is connected between VIN and ground.

As shown in FIG. 2, the first buck converter comprises switches QH1, QL1 and an inductor L1. QH1 and QL1 are connected in series between VIN and ground. L1 is connected between a common node of QH1 and QL1, and VOUT. Throughout the description, the first buck converter may be alternatively referred to as a first phase of the dual-phase constant on-time power converter 200.

The second buck converter comprises switches QH2, QL2 and an inductor L2. QH2 and QL2 are connected in series between VIN and ground. L2 is connected between a common node of QH2 and QL2, and VOUT. Throughout the description, the second buck converter may be alternatively referred to as a second phase of the dual-phase constant on-time power converter 200.

As shown in FIG. 2, the output inductor L1 of the first step-down converter and the output inductor L2 of the second step-down converter are connected together and further connected to a load RL. An output capacitor Co and a load RL are connected in parallel between VOUT and ground.

The switches (e.g., QH1) shown in FIG. 2 may be implemented as n-type metal oxide semiconductor (NMOS) transistors. Alternatively, the switches may be implemented as other suitable controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like.

The control circuit of the dual-phase constant on-time power converter 200 comprises an error amplifier 204, a ramp generator/PWM comparator 205, a master phase on-timer 201, a slave phase on timer 202, a control logic block 210 and a plurality of drivers 211, 212, 221 and 222. Throughout the description, the ramp generator/PWM comparator 205 may be alternatively referred to as a ramp generator 205. The master phase on-timer 201 may be alternatively referred to as a first phase on-timer 201. The slave phase on-timer 202 may be alternatively referred to as a second phase on-timer 202.

As shown in FIG. 2, the inverting input of the error amplifier 204 is employed to detect the output voltage VOUT through a voltage divider formed by resistors R21 and R22. The signal fed into the inverting input of the error amplifier 204 is a feedback signal FB. The non-inverting input of the error amplifier 204 is connected to a predetermined reference VREF. The output of the error amplifier 204 is fed into the ramp generator 205.

A compensation network is connected between the output of the error amplifier 204 and ground. The compensation network comprises resistor R23, capacitor C21 and capacitor C22. The resistor R23 and the capacitor C21 are connected in series and further connected in parallel with the capacitor C22. The compensation network helps to stabilize the control loop and provide sufficient phase margin, thereby improving the transient response performance of the dual-phase constant on-time power converter 200.

The ramp generator 205 is configured to receive the feedback signal FB, the output signal (Vc) of the error amplifier 204, a voltage signal (SW1) on the switching node of the first buck converter and a voltage signal (SW2) on the switching node of the second buck converter. Based on the received signals, the ramp generator 205 is configured to produce a set signal SET for determining a phase shift between the first phase and the second phase of the dual-phase constant on-time power converter 200. The detailed structure and operating principles of the ramp generator 205 will be discussed below with respect to FIGS. 3-4 and 14-15.

The first phase on-timer 201 is configured to receive the gate drive signal HSON1 of QH1 and the gate drive signal LSON1 of QL1. Based on the received signals, the first phase on-timer 201 is configured to produce a first reset signal R1 for determining a turn-on time of the high-side switch QH1 of the first phase of the dual-phase constant on-time power converter 200. The detailed structure and operating principles of the first phase on-timer 201 will be discussed below with respect to FIGS. 8-9.

The second phase on-timer 202 is configured to receive signals ISNS1, ISNS2, the gate drive signal HSON1 of QH1 and the gate drive signal HSON2 of QH2. ISNS1 is a signal representative of the current flowing through the high-side switch QH1 of the first buck converter. ISNS2 is a signal representative of the current flowing through the high-side switch QH2 of the second buck converter. Based on the received signals, the second phase on-timer 202 is configured to produce a second reset signal R2 for determining a turn-on time of the high-side switch QH2 of the second phase of the dual-phase constant on-time power converter 200. The detailed structure and operating principles of the second phase on-timer 202 will be discussed below with respect to FIGS. 10-13.

The control logic block 210 is configured to receive signals SET, R1 and R2. Based on the received signals, the control logic block 210 is configured to generate gate drive signals for the first phase and the second phase of the dual-phase constant on-time power converter 200. The detailed structure and operating principles of the control logic block 210 will be discussed below with respect to FIGS. 5-7.

One advantageous feature of the control circuit of the dual-phase constant on-time power converter 200 shown in FIG. 2 is the control circuit provides a simple and reliable solution for controlling the dual-phase power converter. In particular, the control circuit does not include an oscillator. The system operation frequency is determined by the on-timers (e.g., 201 and 202). The phase shift between the two phases is ensured with the proposed ramp generation mechanism. The control circuit helps provide ultra-fast transient response, natural pulse frequency modulation control at light load and simple control circuitry. Furthermore, the control circuit shown in FIG. 2 applies a simple cycle-by-cycle current sharing method to the dual-phase power converter.

Figure 3:
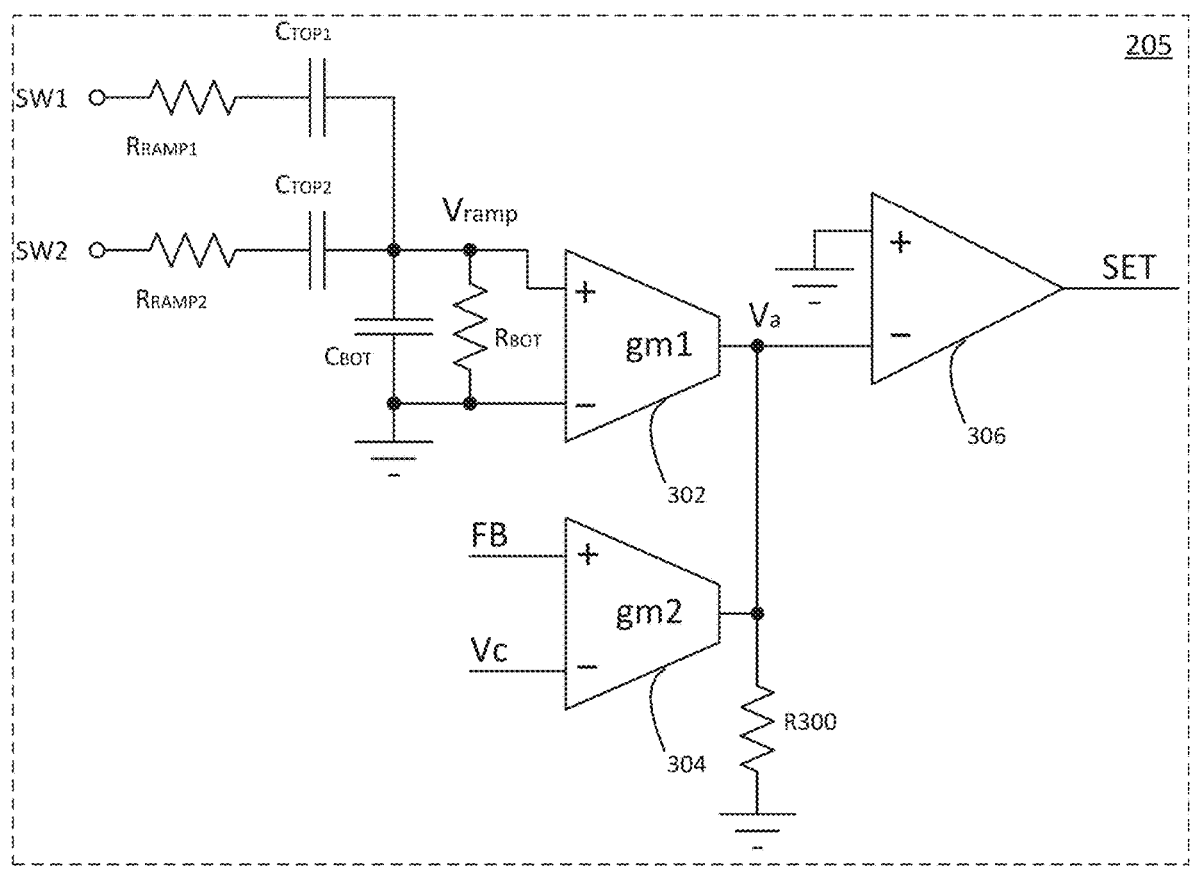
FIG. 3 illustrates a schematic diagram of a first implementation of the ramp generator shown in FIG. 2 in accordance with various embodiments of the present disclosure.

FIG. 3 illustrates a schematic diagram of a first implementation of the ramp generator shown in FIG. 2 in accordance with various embodiments of the present disclosure. The ramp generator 205 comprises a ramp circuit, two transconductance amplifiers 302, 304 and a comparator 306. The ramp circuit comprises a first ramp resistor $R_{RAMP1}$, a first ramp capacitor $C_{TOP1}$, a second ramp resistor $R_{RAMP2}$, a second ramp capacitor $C_{TOP2}$, a third ramp resistor $R_{BOT}$ and a third ramp capacitor $C_{BOT}$.

As shown in FIG. 3, the first ramp resistor $R_{RAMP1}$ and the first ramp capacitor $C_{TOP1}$ are connected in series between the first switching node SW1 of the first phase and the non-inverting input of the first transconductance amplifier 302. The second ramp resistor $R_{RAMP2}$ and the second ramp capacitor $C_{TOP2}$ are connected in series between the second switching node SW2 of the second phase and the non-inverting input of the first transconductance amplifier 302. The third ramp capacitor $C_{BOT}$ and a third ramp resistor $R_{BOT}$ are connected in parallel between the inverting input and the non-inverting input of the first transconductance amplifier 302.

As shown in FIG. 3, the non-inverting input of the first transconductance amplifier 302 is connected to the output of the ramp circuit as described above. The inverting input of the first transconductance amplifier 302 is connected to ground. The non-inverting input of the second transconductance amplifier 304 is configured to receive the feedback signal FB. The inverting input the second transconductance amplifier 304 is configured to receive the error signal Vc generated by the error amplifier 204. An output of the first transconductance amplifier 302 and an output of the second transconductance amplifier 304 are connected together and further connected to ground through a resistor R300. An inverting input of the comparator 306 is connected to the output of the first transconductance amplifier 302 and the output of the second transconductance amplifier 304. A non-inverting input of the comparator 306 is connected to ground. The comparator 306 is configured to generate the set signal.

In FIG. 3, the ramp circuit uses the voltages on the switching nodes SW1 and SW2 to generate an internal ramp signal on the node Vramp. This internal ramp signal and the control voltage signals FB and VC are converted into current signals applied to the resistor R300. The voltage on the node Va is a triangular waveform. This triangular waveform is compared with a ground voltage potential to generate the set signal. The set signal is used to determine the next turn on event for the high-side switch of each phase of the dual-phase constant on-time power converter 200.

Figure 4:
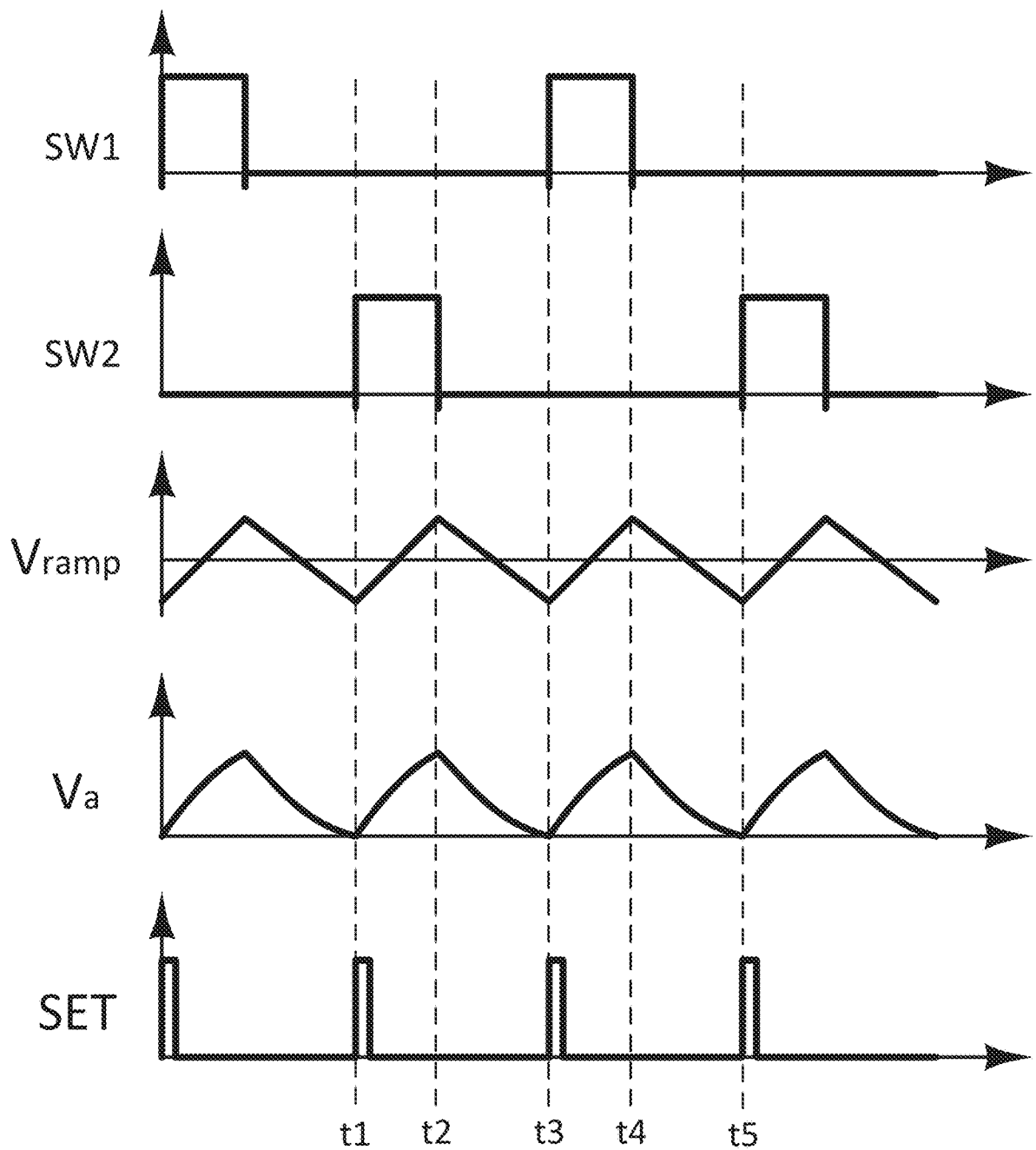
FIG. 4 illustrates timing diagrams associated with the ramp generator shown in FIG. 3 in accordance with various embodiments of the present disclosure.

FIG. 4 illustrates timing diagrams associated with the ramp generator shown in FIG. 3 in accordance with various embodiments of the present disclosure. The horizontal axis of FIG. 4 represents intervals of time. There are five rows. The first row represents the voltage on the first switching node SW1. The second row represents the voltage on the second switching node SW2. The third row represents the voltage on the node Vramp shown in FIG. 3. The fourth row represents the voltage on the node Va shown in FIG. 3. The fifth row represents the set signal generated by the ramp generator 205.

As shown in FIG. 4, at t1, the voltage on the node SW2 changes from zero to a high voltage potential (e.g., VIN). Referring back to FIG. 3, in response to this change, VIN charges $C_{BOT}$ through $R_{RAMP2}$ and $C_{TOP2}$. Vramp increases in a linear manner from t1 to t2. At t1, Vramp is converted into a first current through the first transconductance amplifier 302. The difference between Vc and FB is converted into a second current through the second transconductance amplifier 304. These two currents are added together and converted into a voltage signal through R300. As shown in FIG. 4, at t1, Va reaches zero. Accordingly, the comparator 306 generates a first set pulse. From t1 to t2, Va increases from zero to a peak value.

From t2 to t3, the voltages on SW1 and SW2 are equal to zero. Vramp is discharged. Vramp decreases in a linear manner. Va decreases from the peak value to zero. At t3, once Va reaches zero, the comparator 306 generates a second set pulse.

At t3, the voltage on the switching node SW1 changes from zero to a high voltage potential (e.g., VIN). Referring back to FIG. 3, in response to this change, VIN charges $C_{BOT}$ through $R_{RAMP1}$ and $C_{TOP1}$. Vramp increases in a linear manner t3 to t4. From t4 to t5, the voltages on SW1 and SW2 are equal to zero. Vramp is discharged. Vramp decreases in a linear manner. Va decreases from the peak value to zero. The duration from t1 to t5 is one switching period of the dual-phase constant on-time power converter 200. From t5, the dual-phase constant on-time power converter 200 enters into a new switching period.

Figure 5:
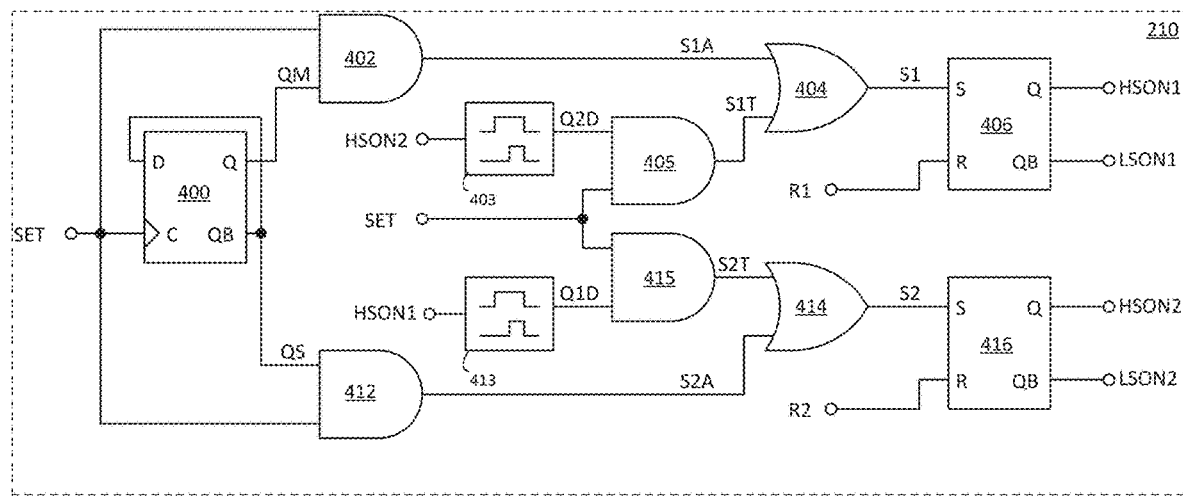
FIG. 5 illustrates a schematic diagram of the control logic block shown in FIG. 2 in accordance with various embodiments of the present disclosure.

FIG. 5 illustrates a schematic diagram of the control logic block shown in FIG. 2 in accordance with various embodiments of the present disclosure. The control logic block 210 comprises a first latch circuit 400, a first AND gate 402, a second AND gate 412, a first delay block 403, a second delay block 413, a third AND gate 405, a fourth AND gate 415, a first OR gate 404, a second OR gate 414, a second latch circuit 406 and a third latch circuit 416.

As shown in FIG. 5, a clock input of the first latch circuit 400 is configured to receive the set signal generated by the ramp generator 205. A data input and a Q-bar output of the first latch circuit 400 are connected together. A first input of the first AND gate 402 is configured to receive the set signal. A second input QM of the first AND gate 402 is connected to a Q output of the first latch circuit 400. A first input QS of the second AND gate 412 is connected to the Q-bar output of the first latch circuit 400. A second input of the second AND gate 412 is configured to receive the set signal.

An input of the first delay block 403 is configured to receive the gate drive signal HSON2 of the high-side switch QH2 of the second phase. An input of the second delay block 413 is configured to receive the gate drive signal HSON1 of the high-side switch QH1 of the first phase. A delay block is employed to add a delay to the input signal fed into the delay block. In other words, the output signal of the delay block is generated through chopping a predetermined leading portion of the input signal.

A first input Q2D of the third AND gate 405 is connected to an output of the first delay block 403. A second input of the third AND gate 405 is configured to receive the set signal. A first input of the fourth AND gate 415 is configured to receive the set signal. A second input Q1D of the fourth AND gate 415 is connected to an output of the second delay block 413.

A first input S1A of the first OR gate 404 is connected to an output of the first AND gate 402. A second input S1T of the first OR gate 404 is connected to an output of the third AND gate 405. A first input S2T of the second OR gate 414 is connected to an output of the fourth AND gate 415. A second input S2A of the second OR gate 414 is connected to an output of the second AND gate 412.

A set input S1 of the second latch circuit 406 is connected to an output of the first OR gate 404. A reset input of the second latch circuit 406 is configured to receive the first reset signal R1. A Q output of the second latch circuit 406 is configured to generate a gate drive signal HSON1 for the high-side switch QH1 of the first phase. A Q-bar output of the second latch circuit 406 is configured to generate a gate drive signal LSON1 for the low-side switch QL1 of the first phase.

A set input S2 of the third latch circuit 416 is connected to an output of the second OR gate 414. A reset input of the third latch circuit 416 is configured to receive the second reset signal R2. A Q output of the third latch circuit 416 is configured to generate a gate drive signal HSON2 for the high-side switch QH2 of the second phase. A Q-bar output of the third latch circuit 416 is configured to generate a gate drive signal LSON2 for the low-side switch QL2 of the second phase.

The control logic block 210 is configured to receive a plurality of set pulses from the ramp generator 205 and a plurality of reset pulses from the on-timers 201 and 202 to generate gate control signals for the four power devices QH1, QL1, QH2 and QL2 in the dual-phase constant on-time power converter 200.

Figure 6:
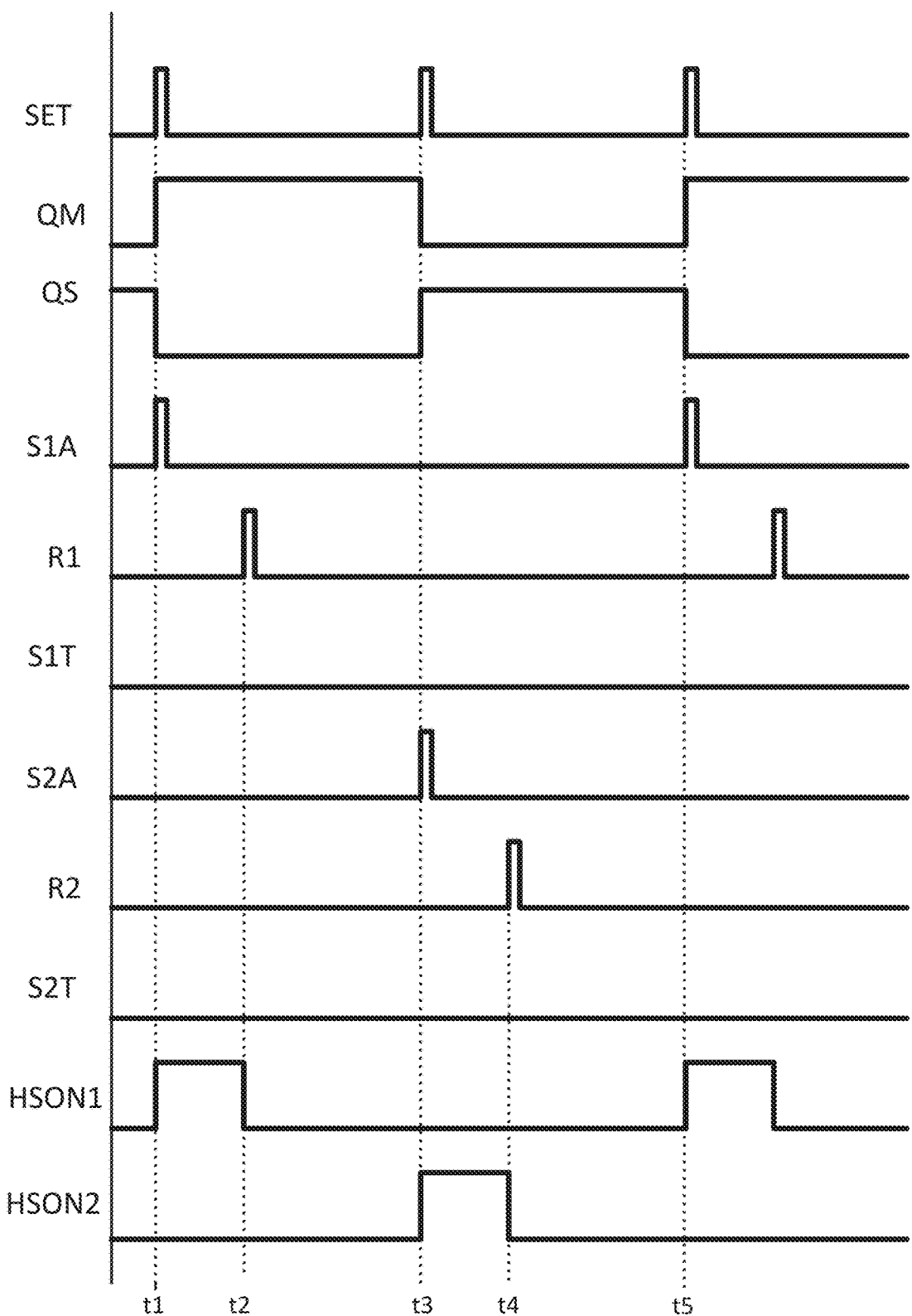
FIG. 6 illustrates steady state timing diagrams associated with the control logic block shown in FIG. 5 in accordance with various embodiments of the present disclosure.

FIG. 6 illustrates steady state timing diagrams associated with the control logic block shown in FIG. 5 in accordance with various embodiments of the present disclosure. The horizontal axis of FIG. 6 represents intervals of time. There are eleven rows. The first row represents the set signal SET. The second row represents the signal QM at the Q output of the first latch circuit 400. The third row represents the signal QS at the Q-bar output of the first latch circuit 400. The fourth row represents the output signal S1A of the first AND gate 402. The fifth row represents the first reset signal R1. The sixth row represents the output signal S1T of the third AND gate 405. The seventh row represents the output signal S2A of the second AND gate 412. The eighth row represents the second reset signal R2. The ninth row represents the output signal S2T of the fourth AND gate 415. The tenth row represents the gate drive signal HSON1. The eleventh row represents the gate drive signal HSON2.

At t1, the set signal has a first pulse. In response to this pulse, QM at the Q output of the first latch circuit 400 changes from a logic low state to a logic high state. QS at the Q-bar output of the first latch circuit 400 changes from a logic high state to a logic low state. The set signal and QM are processed by the first AND gate 402 to generate a pulse at S1A. This pulse (S1A) passes through the first OR gate 404 and is fed into the set input of the second latch circuit 406. According to the operating principle of the latch circuit, the Q output of the second latch circuit 406 changes from a logic low state to a logic high state. The Q output of the second latch circuit 406 is the gate drive signal HSON1. As shown in FIG. 6, the gate drive signal HSON1 changes from a logic low state to a logic high state at t1, and maintains the logic high state until the first reset signal R1 has a pulse at t2.

At t2, the gate drive signal HSON1 changes from a logic high state to a logic low state. At t3, the set signal has a second pulse. In response to this pulse, QM at the Q output of the first latch circuit 400 changes from a logic high state to a logic low state. QS at the Q-bar output of the first latch circuit 400 changes from a logic low state to a logic high state. The set signal and QS are processed by the second AND gate 412 to generate a pulse at S2A. This pulse (S2A) passes through the second OR gate 414 and is fed into the set input of the third latch circuit 416. According to the operating principle of the latch circuit, the Q output of the third latch circuit 416 changes from a logic low state to a logic high state. The Q output of the third latch circuit 416 is the gate drive signal HSON2. As shown in FIG. 6, the gate drive signal HSON2 changes from a logic low state to a logic high state at t3, and maintains the logic high state until the second reset signal R2 has a pulse at t4. At t4, the gate drive signal HSON2 changes from a logic high state to a logic low state. The duration from t1 to t5 is one switching period of the dual-phase constant on-time power converter 200. From t5, the dual-phase constant on-time power converter 200 enters into a new switching period.

As shown in FIG. 6, during steady state operation, the set signal SET is a sequence of narrow pulses. The control logic block 210 distributes the set pulses to each phase in an alternating manner to turn on the high-side switch of each phase. The on-timers generate reset pulses to terminate the turn-on of the high side switches and initiate the turn-on of the low-side switch of each phase.

Figure 7:
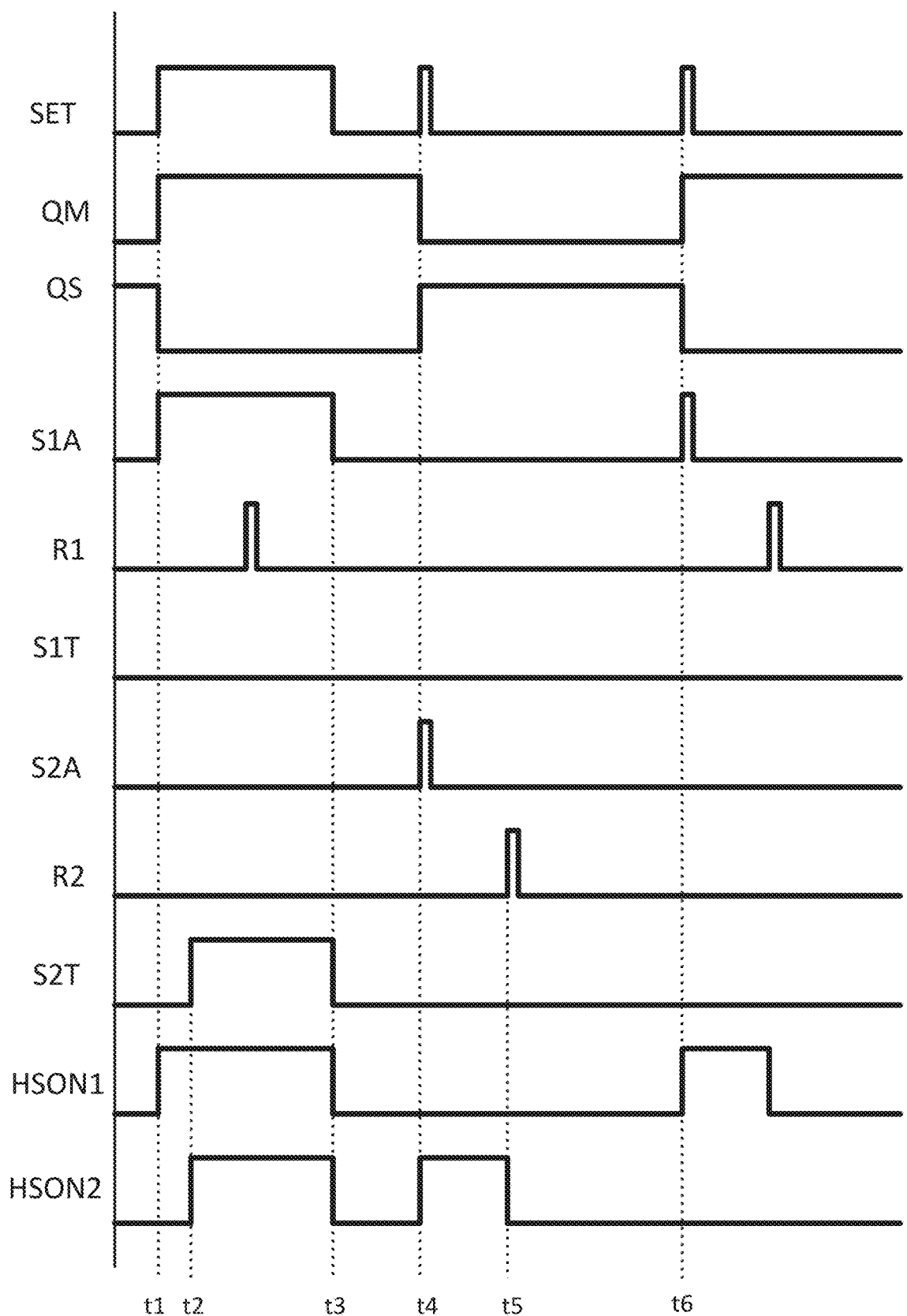
FIG. 7 illustrates load transient timing diagrams associated with the control logic block shown in FIG. 5 in accordance with various embodiments of the present disclosure.

FIG. 7 illustrates load transient timing diagrams associated with the control logic block shown in FIG. 5 in accordance with various embodiments of the present disclosure. The eleven rows of FIG. 7 are similar to the eleven rows shown in FIG. 6, and hence are not described again to avoid repetition.

At t1, a step up load transient occurs. In response to the step up load transient, the output voltage VOUT and FB voltage drop accordingly. The set pulse generated by the ramp generator 205 expands to a wide pulse occupying from t1 to t3. Referring back to FIG. 5, when the set pulse is wider than the delay time in the second delay block 413, the output signal S2T of the fourth AND gate 415 generates a logic high state at t2 and maintains its logic high state until t3. From t2 to t3, the logic high state of S2T passes through the second OR gate 414 and is fed into the third latch circuit 416. The third latch circuit 416 generates a logic high state from t2 to t3. In other words, the high-side switches of the two phases are turned on at the same time to speed up the transient response.

During a step down load transient, the output voltage VOUT overshoots, and FB voltage becomes higher. In response to the higher FB voltage, the ramp generator 205 stops generating any new set pulses until the FB voltage drops back to a normal range.

The operating principle of the control logic block 210 at t4, t5 and t6 is similar to that described above with respect to FIG. 6, and hence is not discussed again herein. In FIG. 7, the duration from t1 to t6 is one switching period of the dual-phase constant on-time power converter 200. From t6, the dual-phase constant on-time power converter 200 enters into a new switching period.

Figure 8:
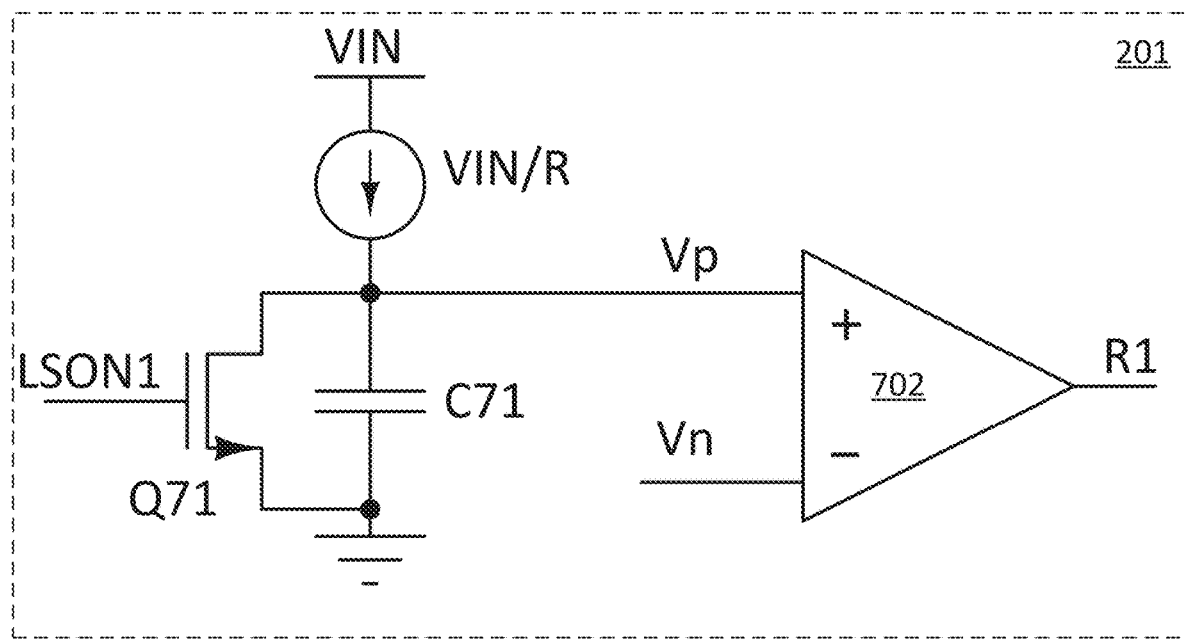
FIG. 8 illustrates a schematic diagram of the first phase on-timer shown in FIG. 2 in accordance with various embodiments of the present disclosure.

FIG. 8 illustrates a schematic diagram of the first phase on-timer shown in FIG. 2 in accordance with various embodiments of the present disclosure. The first phase on-timer 201 comprises a current source, a switch Q71, a capacitor C71 and a comparator 702.

As shown in FIG. 8, the current source and the capacitor C71 are connected in series between the input power source VIN and ground. As shown in FIG. 8, a current flowing through the current source is proportional to VIN. In particular, the current is equal to VIN divided by R. R is a predetermined resistance value.

The switch Q71 is connected in parallel with the capacitor C71. A gate of the switch Q71 is controlled by the gate drive signal LSON1 of the low-side switch QL1 of the first phase. The non-inverting input of the comparator 702 is connected to a common node of the current source and the capacitor C71. The signal fed into the non-inverting input of the comparator 702 is denoted as Vp. An inverting input of the comparator 702 is configured to receive a reference voltage Vn. In some embodiments, Vn is equal to a product of the input voltage VIN and a duty cycle of the dual-phase constant on-time power converter 200. The output of the comparator 702 is configured to generate the first reset signal R1.

Figure 9:
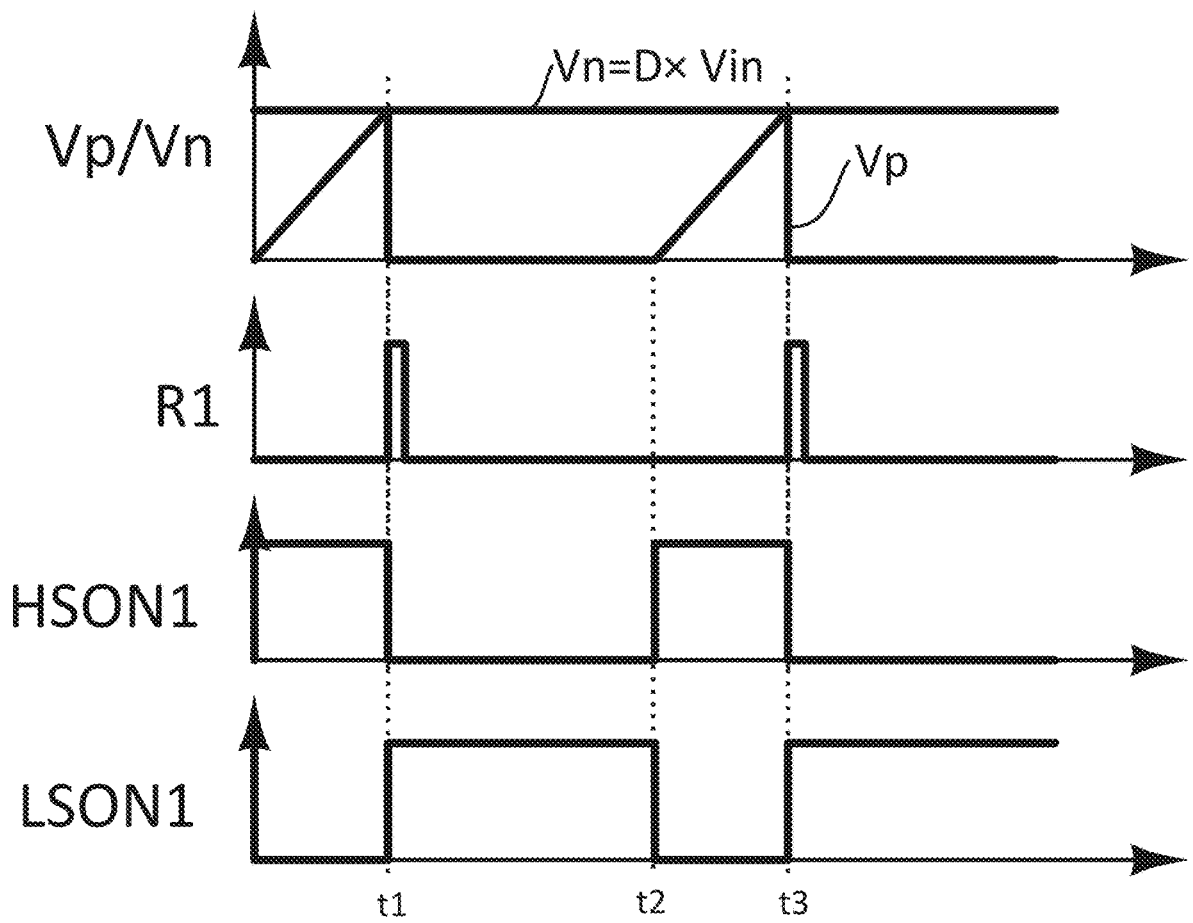
FIG. 9 illustrates timing diagrams associated with the first phase on-timer shown in FIG. 8 in accordance with various embodiments of the present disclosure.

FIG. 9 illustrates timing diagrams associated with the first phase on-timer shown in FIG. 8 in accordance with various embodiments of the present disclosure. The horizontal axis of FIG. 9 represents intervals of time. There are four rows. The first row represents the signals Vp and Vn shown in FIG. 8. The second row represents the first reset signal R1. The third row represents the high-side gate drive signal HSON1 of the first phase. The fourth row represents the low-side gate drive signal LSON1 of the first phase.

Referring back FIG. 8, the current flowing through the current source is equal to VIN/R. This current is used to charge the capacitor C71. Vn is equal to VIN times the duty cycle D. When the voltage across the capacitor C71 reaches Vn at t1, a reset pulse is generated. The reset pulse is used to turn off the high-side switch of the first phase. As shown in FIG. 9, the high-side gate drive signal HSON1 changes from a logic high state to a logic low state, while at the same time, the low-side gate drive signal LSON1 changes from a logic low state to a logic high state. At t2, the low-side gate drive signal LSON1 changes from a logic high state to a logic low state. In response to this change, the current source starts to charge the capacitor C71 in a linear manner. At t3, the voltage across the capacitor C71 reaches Vn again.

As described above, Vn can be expressed as:

$$Vn = D \times Vin \quad (1)$$

The peak value of Vp can be expressed as:

$$Vp = \frac{Vin}{R \times C} \times \frac{D}{fsw} \quad (2)$$

In Equation (2), C is the capacitance value of C71. D is the duration of the turn-on time of HSON1, and fsw is the switching frequency of the dual-phase constant on-time power converter 200. As described above, when the peak value of Vp reaches Vn, the first reset signal R1 is generated. In other words, Vn in Equation (1) is equal to Vp in Equation (2). Based on this relationship, the switching frequency fsw can be expressed as:

$$fsw = \frac{1}{R \cdot C} \quad (3)$$

Equation (3) indicates the switching frequency is determined by the capacitance of C71 and the resistor R, which is used to set the current flowing through the current source.

In some embodiments, the first phase is a master phase. The second phase is a slave phase. The on-timer of the master phase is used to determine the switching frequency. The on-timer of the slave phase is used to achieve current sharing between the master phase and the slave phase.

Figure 10:
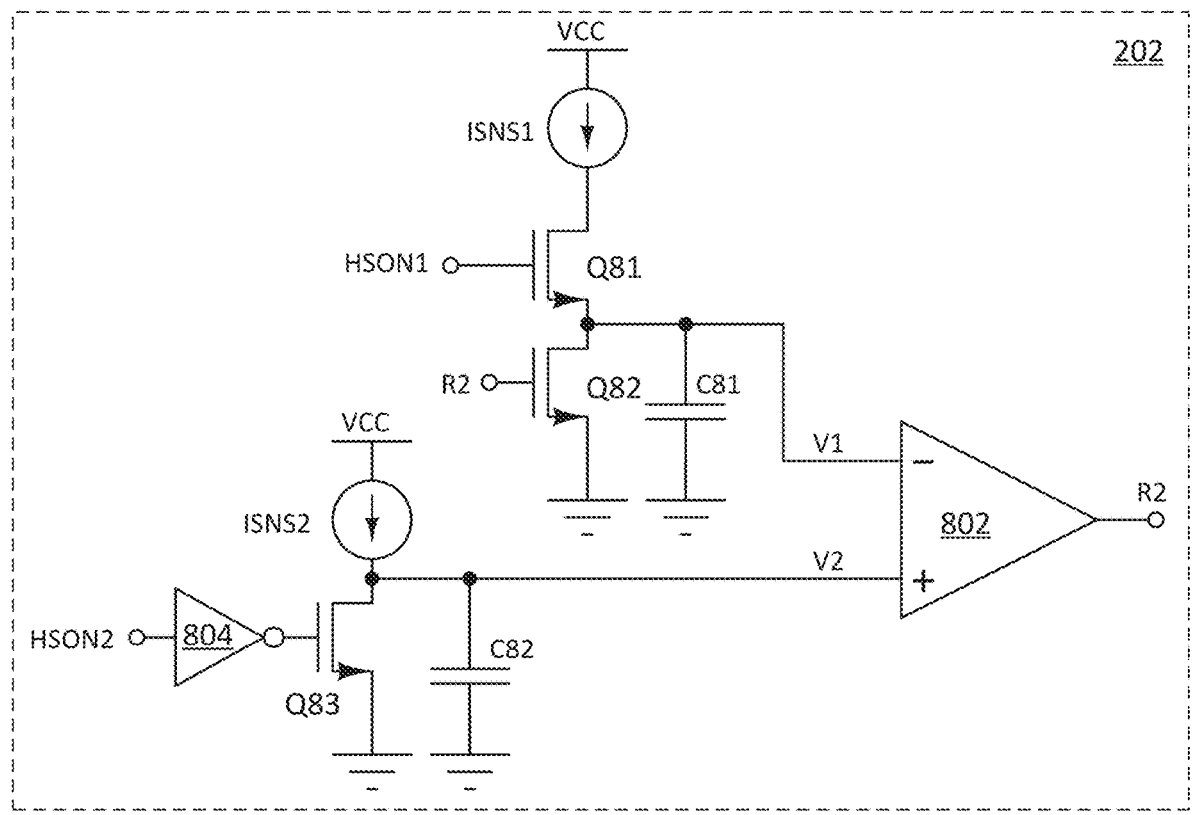
FIG. 10 illustrates a schematic diagram of a first implementation of the second phase on-timer shown in FIG. 2 in accordance with various embodiments of the present disclosure.

FIG. 10 illustrates a schematic diagram of a first implementation of the second phase on-timer shown in FIG. 2 in accordance with various embodiments of the present disclosure. The second phase on-timer 202 comprises a first sensed current source ISNS1, a second sensed current source ISNS2, switches Q81, Q82, Q83, capacitors C81, C82, an inverter 804 and a comparator 802.

A current flowing through the first sensed current source ISNS1 is proportional to a current flowing through the high-side switch QH1 of the first phase of the power converter. A current flowing through the second sensed current source ISNS2 is proportional to a current flowing through the high-side switch QH2 of the second phase of the power converter.

As shown in FIG. 10, the first sensed current source ISNS1, a first control switch Q81 and a second control switch Q82 are connected in series between a bias voltage source VCC and ground. A gate of the first control switch Q81 is controlled by the gate drive signal HSON1 of the high-side switch QH1 of the first phase of the power converter. A gate of the second control switch Q82 is controlled by the second reset signal R2. A first capacitor C81 is connected in parallel with the second control switch Q82. A first signal V1 is tapped at a common node of the first control switch Q81 and the second control switch Q82. The first signal V1 is representative of the current flowing through the high-side switch QH1 of the first phase of the power converter.

The second sensed current source ISNS2 and a third control switch Q83 are connected in series between the bias voltage source VCC and ground. A gate of the third control switch Q83 is controlled by an inverse signal of the gate drive signal HSON2 of the high-side switch QH2 of the second phase of the power converter. The inverse signal of HSON2 is obtained by passing HSON2 through the inverter 804. A second capacitor C82 is connected in parallel with the third control switch Q83. A second signal V2 is tapped at a common node of the second sensed current source ISNS2 and the third control switch Q83. The second signal V2 is representative of the current flowing through the high-side switch QH2 of the second phase of the power converter.

An inverting input of the comparator 802 is configured to receive the first signal V1. V1 is representative of the current flowing through the high-side switch QH1 of the first phase of the power converter. A non-inverting input of the comparator 802 is configured to receive the second signal V2. V2 is representative of a current flowing through the high-side switch QH2 of the second phase of the power converter. The output of the comparator 802 is configured to generate the second reset signal R2.

In operation, ISNS1 is the sensed high-side switch current of the master phase. ISNS2 is the sensed high-side switch current of the slave phase. During the turn-on time of the high-side switch of the master phase, ISNS1 current is used to charge the first capacitor C81. The master phase current information is stored in C81 during this cycle. During the turn-on time of the high-side switch of the slave phase, ISNS2 current is used to charge the second capacitor C82. Once the voltage across C82 reaches the voltage across C81, a reset pulse is generated to turn off the high-side switch QH2 of the slave phase. At the same time, the reset pulse turns on Q82 to reset the voltage on C81 for the next switching cycle.

Figure 11:
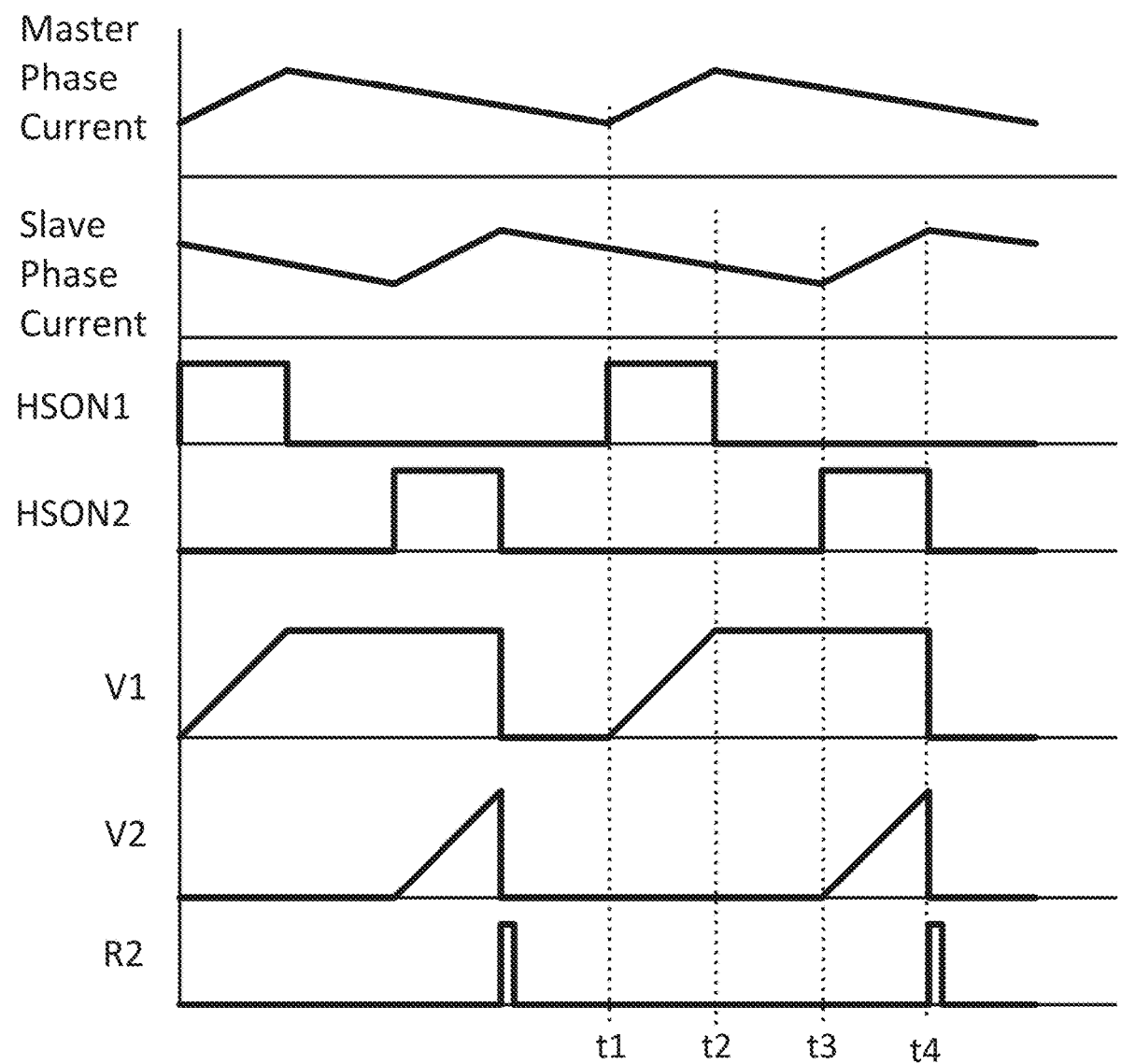
FIG. 11 illustrates timing diagrams associated with the second phase on-timer shown in FIG. 10 in accordance with various embodiments of the present disclosure.

FIG. 11 illustrates timing diagrams associated with the second phase on-timer shown in FIG. 10 in accordance with various embodiments of the present disclosure. The horizontal axis of FIG. 11 represents intervals of time. There are seven rows. The first row represents the master phase current (the current flowing through L1 shown in FIG. 2). The second row represents the slave phase current (the current flowing through L2 shown in FIG. 2). The third row represents the high-side gate drive signal HSON1 of the first phase. The fourth row represents the high-side gate drive signal HSON2 of the second phase. The fifth row represents the first signal V1 shown in FIG. 10. The sixth row represents the second signal V2 shown in FIG. 10. The seventh row represents the second reset signal R2.

From t1 to t2, the high-side switch QH1 is turned on. The master phase current ramps up in a linear manner. Referring back to FIG. 10, from t1 to t2, ISNS1 current is used to charge the first capacitor C81. V1 increases in a non-linear manner. At t2, the high-side switch QH1 is turned off. V1 maintains its voltage until t4. At t4, C81 is reset by the second reset signal R2. V1 drops to zero at t4 after C81 has been reset. It should be noted that V1 is of a non-linear slope because V1 is an integration of ISNS1. For simplicity, a linear slope is used to replace the non-linear slope of V1 in FIG. 11 for illustration purposes.

At t3, the high-side switch QH2 is turned on. The slave phase current ramps up in a linear manner from t3 to t4. Referring back to FIG. 10, ISNS2 current is used to charge the second capacitor C82. V2 increases in a non-linear manner from t3 to t4. At t4, the voltage across C82 (V2) reaches the voltage across C81 (V1). The comparator 802 generates a second reset pulse R2 at t4. It should be noted that V2 is of a non-linear slope because V2 is an integration of ISNS2. For simplicity, a linear slope is used to replace the non-linear slope of V2 in FIG. 11 for illustration purposes.

The second phase on-timer (slave on-timer) shown FIG. 10 is suitable for a system having a duty cycle less than 50%. For a system with a duty cycle higher than 50%, before the second reset pulse is generated, the high-side switch of the first phase (master phase) is turned on again. For this kind of application, the second phases on-timer (slave phase on-timer) shown in FIG. 12 can be used.

Figure 12:
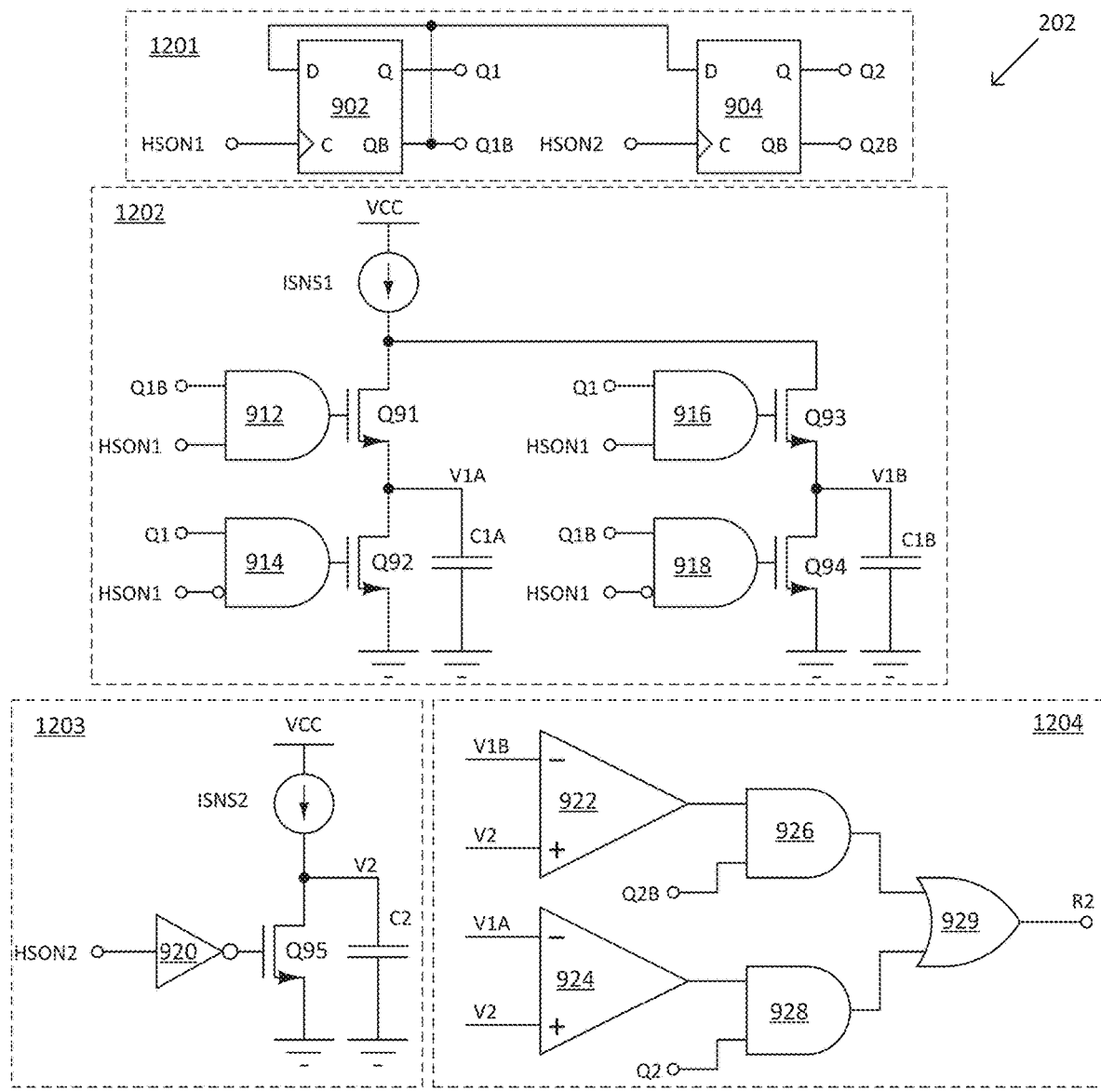
FIG. 12 illustrates a schematic diagram of a second implementation of the second phase on-timer shown in FIG. 2 in accordance with various embodiments of the present disclosure.

FIG. 12 illustrates a schematic diagram of a second implementation of the second phase on-timer shown in FIG. 2 in accordance with various embodiments of the present disclosure. The second phase on-timer 202 comprises a gate drive signal conversion circuit 1201, a current information storage circuit 1202, a current sensing circuit 1203 and a reset signal circuit 1204.

The gate drive signal conversion circuit 1201 is configured to extend the high-side gate drive signals HSON1 and HSON2 in response to a duty cycle greater than 50%. The current information storage circuit 1202 is configured to store a signal representative of the current flowing through the high-side switch QH1 of the first phase of the power converter in two capacitors C1A and C1B in an alternating manner. The current sensing circuit 1203 is configured to generate a signal representative of a current flowing through the high-side switch QH2 of the second phase of the power converter. The reset signal circuit 1204 is configured to generate the second reset signal R2.

As shown in FIG. 12, the gate drive signal conversion circuit 1201 comprises a first latch circuit 902 and a second latch circuit 904. A data input of the first latch circuit 902 and a data input of the second latch circuit 904 are connected together and further connected to a Q-bar output of the first latch circuit 902. A clock input of the first latch circuit 902 is configured to receive the gate drive signal of the high-side switch QH1 of the first phase of the power converter. A clock input of the second latch circuit 904 is configured to receive the gate drive signal of the high-side switch QH2 of the second phase of the power converter.

As shown in FIG. 12, the current information storage circuit 1202 comprises a first AND gate 912, a second AND gate 914, a third AND gate 916, a fourth AND gate 918, a first control switch Q91, a second control switch Q92, a third control switch Q93, a fourth control switch Q94, a first capacitor C1A, a second capacitor C1B and a first sensed current source ISNS1.

A first input of the first AND gate 912 is connected to the Q-bar output of the first latch circuit 902. A second input of the first AND gate 912 is configured to receive the gate drive signal HSON1 of the high-side switch QH1 of the first phase of the power converter.

A first input of the second AND gate 914 is connected to the Q output of the first latch circuit 902. A second input of the second AND gate 914 is configured to receive an inverse signal of the gate drive signal HSON1 of the high-side switch QH1 of the first phase of the power converter.

A first input of the third AND gate 916 is connected to the Q output of the first latch circuit 902. A second input of the third AND gate 916 is configured to receive the gate drive signal HSON1 of the high-side switch QH1 of the first phase of the power converter.

A first input of the fourth AND gate 918 is connected to the Q-bar output of the first latch circuit 902. A second input of the fourth AND gate 918 is configured to receive the inverse signal of the gate drive signal HSON1 of the high-side switch QH1 of the first phase of the power converter.

The first sensed current source ISNS1, the first control switch Q91 and the second control switch Q92 are connected in series between a bias voltage source VCC and ground. A gate of the first control switch Q91 is connected to an output of the first AND gate 912. A gate of the second control switch Q92 is connected to an output of the second AND gate 914. The first capacitor C1A is connected in parallel with the second control switch Q92. The first capacitor C1A is configured to store a signal V1A. In some embodiments, V1A is representative of the current flowing through the high-side switch QH1 of the first phase of the power converter in a first cycle.

The third control switch Q93 and the fourth control switch Q94 are connected in series between a common node of the first sensed current source ISNS1 and the first control switch Q91, and ground. A gate of the third control switch Q93 is connected to an output of the third AND gate 916. A gate of the fourth control switch Q94 is connected to an output of the fourth AND gate 918. The second capacitor C1B is connected in parallel with the fourth control switch Q94. The second capacitor C1B is configured to store a signal V1B. In some embodiments, V1B is representative of the current flowing through the high-side switch QH1 of the first phase of the power converter in a second cycle immediately adjacent to the first cycle.

The current sensing circuit 1203 comprises a second sensed current source ISNS2, a fifth control switch Q95, a third capacitor C2 and an inverter 920. The second sensed current source ISNS2 and the fifth control switch Q95 are connected in series between the bias voltage source VCC and ground. A gate of the fifth control switch Q95 is configured to receive an inverse signal of the gate drive signal HSON2 of the high-side switch QH2 of the second phase of the power converter. The inverse signal of the gate drive signal HSON2 is obtained through passing the gate drive signal HSON2 through the inverter 920. The third capacitor C2 is connected in parallel with the fifth control switch Q95. The third capacitor C2 is configured to store a signal V2. In some embodiments, V2 is representative of the current flowing through the high-side switch QH2 of the second phase of the power converter.

The reset signal circuit 1204 comprises a first comparator 922, a second comparator 924, a fifth AND gate 926, a sixth AND gate 928 and an OR gate 929. An inverting input of the first comparator 922 is configured to receive the signal V1B representative of the current flowing through the high-side switch QH1 of the first phase of the power converter in the second cycle. A non-inverting input of the first comparator 922 is configured to receive the signal V2 representative of the current flowing through the high-side switch QH2 of the second phase of the power converter.

An inverting input of the second comparator 924 is configured to receive the signal V1A representative of the current flowing through the high-side switch QH1 of the first phase of the power converter in the first cycle. A non-inverting input of the second comparator 924 is configured to receive the signal V2 representative of the current flowing through the high-side switch QH2 of the second phase of the power converter.

A first input of the fifth AND gate 926 is connected to an output of the first comparator 922. A second input of the fifth AND gate 926 is connected to a Q-bar output of the second latch circuit 904.

A first input of the sixth AND gate 928 is connected to an output of the second comparator 924. A second input of the sixth AND gate 928 is connected to a Q output of the second latch circuit 904.

A first input of the OR gate 929 is connected to an output of the fifth AND gate 926. A second input of the OR gate 929 is connected to an output of the sixth AND gate 928. The OR gate 929 is configured to generate the second reset signal R2.

Figure 13:
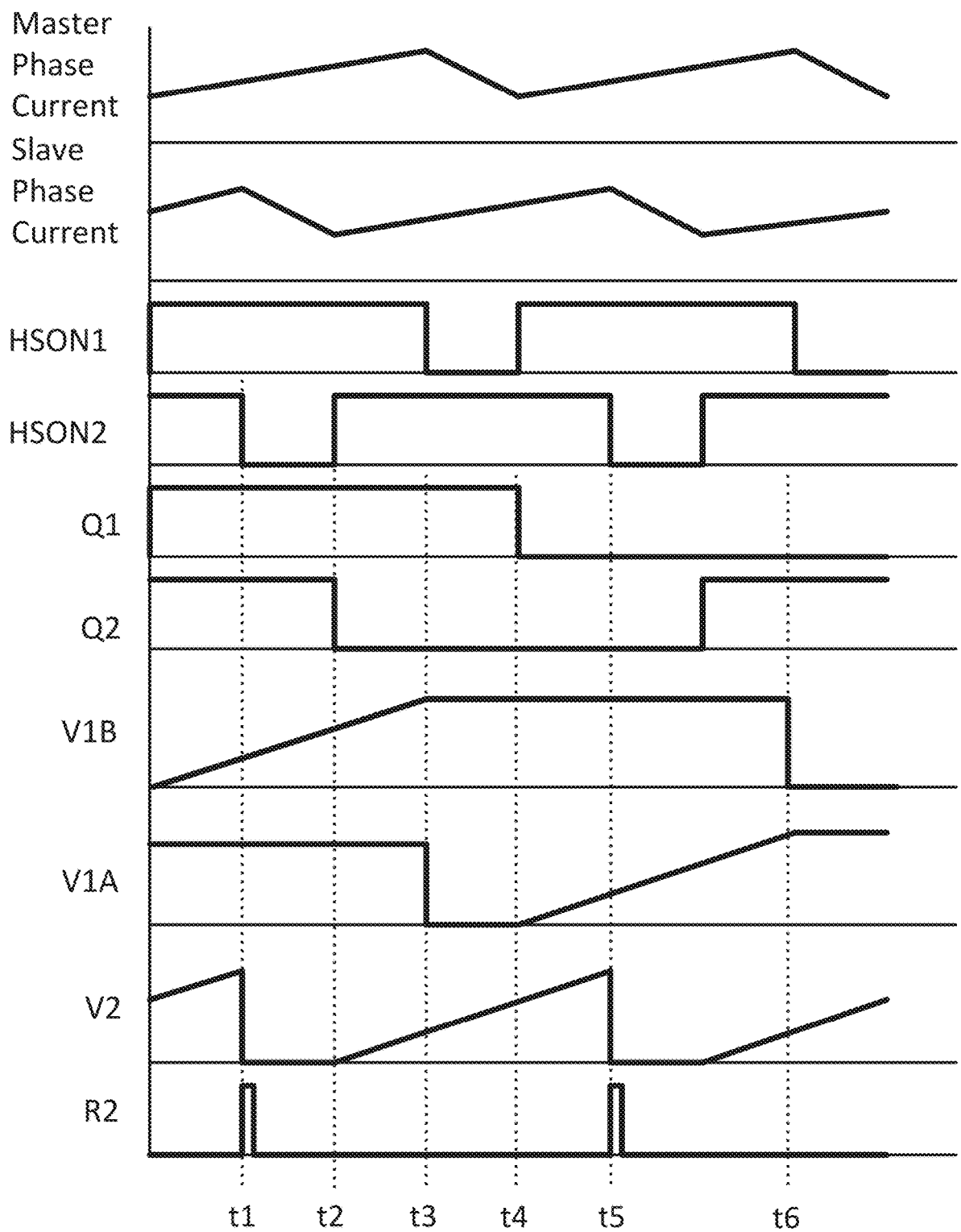
FIG. 13 illustrates timing diagrams associated with the second phase on-timer shown in FIG. 12 in accordance with various embodiments of the present disclosure.

FIG. 13 illustrates timing diagrams associated with the second phase on-timer shown in FIG. 12 in accordance with various embodiments of the present disclosure. The horizontal axis of FIG. 13 represents intervals of time. There are ten rows. The first row represents the master phase current (the current flowing through L1 shown in FIG. 2). The second row represents the slave phase current (the current flowing through L2 shown in FIG. 2). The third row represents the high-side gate drive signal HSON1 of the first phase. The fourth row represents the high-side gate drive signal HSON2 of the second phase. The fifth row represents the output signal Q1 of the first latch circuit 902 shown in FIG. 12. The sixth row represents the output signal Q2 of the second latch circuit 904 shown in FIG. 12. The seventh row represents the signal V1B shown in FIG. 12. The eighth row represents the signal V1A shown in FIG. 12. The ninth row represents the signal V2 shown in FIG. 12. The tenth row represents the second reset signal R2.

At t1, V2 reaches V1A. The second comparator 924 generates a pulse. Q2 is of a logic high state. The sixth AND gate 928 generates a pulse. The pulse passes through the OR gate 929 and becomes the first pulse of the second reset signal R2. R2 turns off the high-side switch QH2 of the second phase of the power converter. HSON2 changes from a logic high state to a logic low state at t1. The change of HSON2 resets the third capacitor C2. As a result, the voltage V2 across C2 drops to zero at t1.

At t2, the high-side switch QH2 of the second phase of the power converter is turned on again. HSON2 changes from a logic low state to a logic high state. Q95 is turned off. ISNS2 charges C2 again. At t3, the high-side switch QH1 of the first phase of the power converter is turned off. HSON1 changes from a logic high state to a logic low state. In response to this change, ISNS1 stops charging C1B. Q94 remains off. The voltage V1B across C1B is held until t6.

At t4, the high-side switch QH1 of the first phase of the power converter is turned on again. HSON1 changes from a logic low state to a logic high state. Q91 is turned on. ISNS1 charges C1A in a non-linear manner. At t5, V2 reaches V1B. The first comparator 922 generates a pulse. Q2B is of a logic high state. The fifth AND gate 926 generates a pulse. The pulse passes through the OR gate 929 and becomes the second pulse of the second reset signal R2.

It should be noted that V1A and V1B are of a non-linear slope because V1A and V1B are an integration of their respective ISNS1 and ISNS2. For simplicity, from the beginning to t3, a linear slope is used to replace the non-linear slope of V1B for illustration purposes. Likewise, from t4 to t6, a linear slope is used to replace the non-linear slope of V1A for illustration purposes.

For applications having a duty cycle close to 50%, the ramp generator 205 needs additional circuit elements. More particularly, when the duty cycle is close to 50%, the ramp amplitude generated from FIG. 4 becomes smaller. Specifically, when the duty cycle is equal to 50%, the ramp amplitude is close to zero. This low amplitude of the ramp will cause unstable operation mode of the system. For this kind of application (duty cycle equal to 50% or close to 50%), the ramp generator shown in FIG. 15 can be used.

Figure 14:
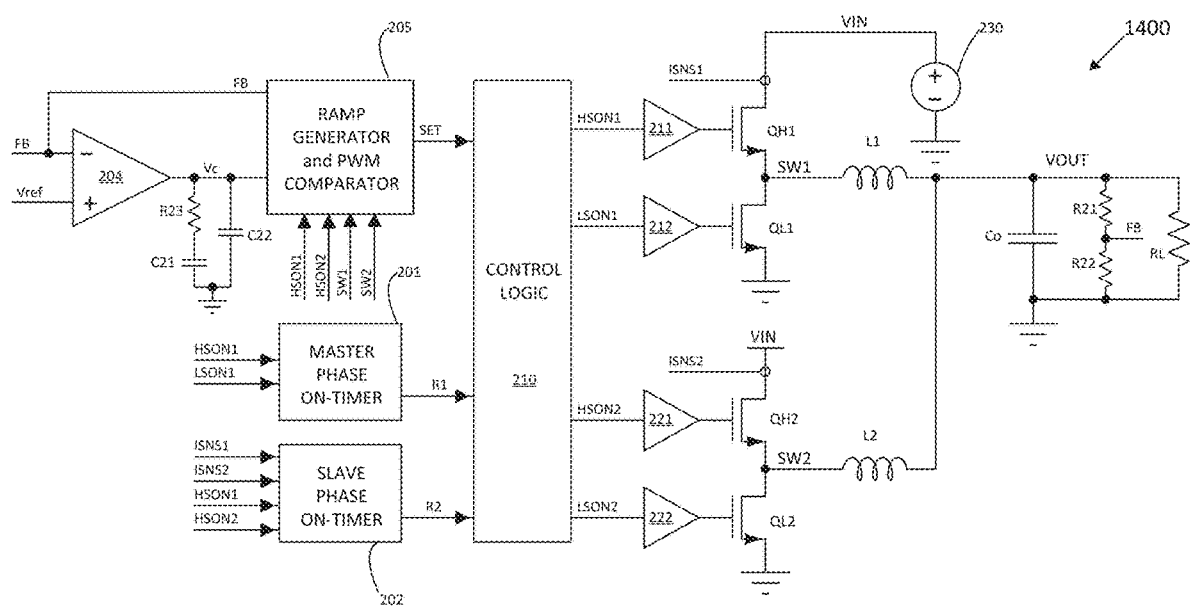
FIG. 14 illustrates a schematic diagram of another dual-phase constant on-time power converter in accordance with various embodiments of the present disclosure.

FIG. 14 illustrates a schematic diagram of another dual-phase constant on-time power converter in accordance with various embodiments of the present disclosure. The dual-phase constant on-time power converter 1400 is similar to the dual-phase constant on-time power converter 200 shown in FIG. 2 except that the duty cycle of the dual-phase constant on-time power converter 1400 can be close to 50%. As a result of having a duty cycle close to 50%, the ramp generator 205 needs additional signals. In particular, the ramp generator 205 is configured to receive two more signals, HSON1 and HSON2 as shown in FIG. 14. The detailed structure of the ramp generator 205 will be discussed below with respect to FIG. 15.

Figure 15:
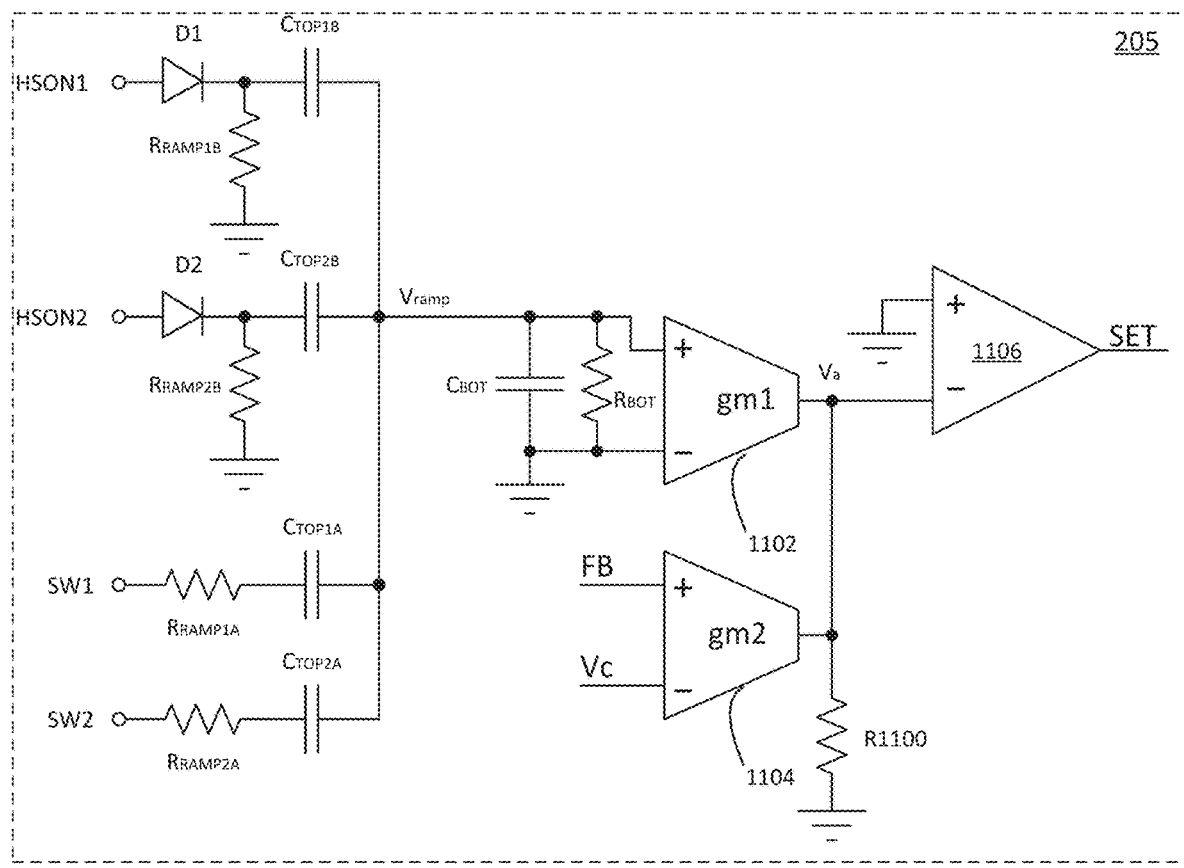
FIG. 15 illustrates a schematic diagram of a second implementation of the ramp generator shown in FIG. 2 in accordance with various embodiments of the present disclosure.

FIG. 15 illustrates a schematic diagram of a second implementation of the ramp generator shown in FIG. 2 in accordance with various embodiments of the present disclosure. The ramp generator 205 comprises a first diode D1, a first ramp capacitor $C_{TOP1B}$, a first ramp resistor $R_{RAMP1B}$, a second diode D2, a second ramp capacitor $C_{TOP2B}$, a second ramp resistor $R_{RAMP2B}$, a third ramp capacitor $C_{TOP1A}$, a third ramp resistor $R_{RAMP1A}$, a fourth ramp capacitor $C_{TOP2A}$, a fourth ramp resistor $R_{RAMP2A}$, a fifth ramp capacitor $C_{BOT}$, a fifth ramp resistor $R_{BOT}$, a first transconductance amplifier 1102, a second transconductance amplifier 1104, a resistance R1100 and a comparator 1106.

As shown in FIG. 15, the first diode D1 and the first ramp capacitor $C_{TOP1B}$ are connected in series. An anode of the first diode D1 is configured to receive the gate drive signal HSON1 of the high-side switch QH1 of the first phase of the power converter. The first ramp capacitor $C_{TOP1B}$ is connected to a voltage ramp node Vramp. The first ramp resistor $R_{RAMP1B}$ is connected between a common node of the first diode D1 and the first ramp capacitor $C_{TOP1B}$, and ground.

The second diode D2 and the second ramp capacitor $C_{TOP2B}$ are connected in series. An anode of the second diode D2 is configured to receive the gate drive signal HSON2 of the high-side switch QH2 of the second phase of the power converter. The second ramp capacitor $C_{TOP2B}$ is connected to the voltage ramp node Vramp. The second ramp resistor $R_{RAMP2B}$ is connected between a common node of the second diode D2 and the second ramp capacitor $C_{TOP2B}$, and ground.

The third ramp resistor $R_{RAMP1A}$ and the third ramp capacitor $C_{TOP1A}$ are connected in series between a switching node SW1 of the first phase of the power converter and the voltage ramp node Vramp. The fourth ramp resistor $R_{RAMP2A}$ and the fourth ramp capacitor $C_{TOP2A}$ are connected in series between a switching node SW2 of the second phase of the power converter and the voltage ramp node Vramp.

The fifth ramp capacitor $C_{BOT}$ and the fifth ramp resistor $R_{BOT}$ are connected in parallel between the voltage ramp node Vramp and ground. A non-inverting input of the first transconductance amplifier 1102 is connected to the voltage ramp node Vramp. An inverting input of the first transconductance amplifier 1102 is connected to ground. A non-inverting input of the second transconductance amplifier 1104 is configured to receive the feedback signal FB of the power converter. An inverting input of the second transconductance amplifier 1104 is configured to receive the error signal generated by the error amplifier of the power converter. An output of the first transconductance amplifier 1102 and an output of the second transconductance amplifier 1104 are connected together and further connected to ground through a resistor R1100. An inverting input of the comparator 1106 is connected to the output of the first transconductance amplifier 1102 and the output of the second transconductance amplifier 1104. A non-inverting input of the comparator 1106 is connected to ground. The comparator 1106 is configured to generate the set signal.

Figure 16:
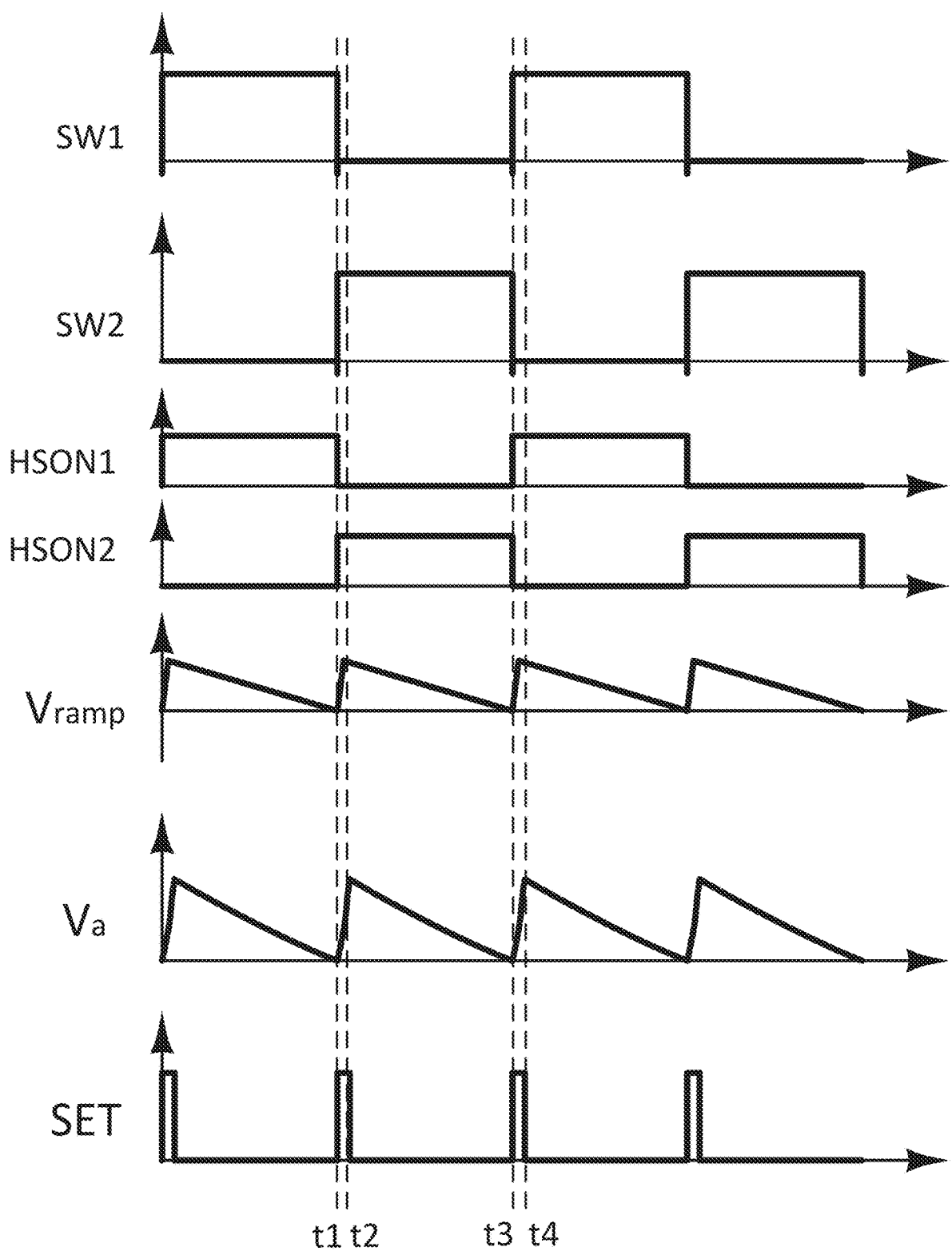
FIG. 16 illustrates timing diagrams associated with the of the ramp generator shown in FIG. 15 in accordance with various embodiments of the present disclosure.

FIG. 16 illustrates timing diagrams associated with the of the ramp generator shown in FIG. 15 in accordance with various embodiments of the present disclosure. The horizontal axis of FIG. 16 represents intervals of time. There are seven rows. The first row represents the voltage on the first switching node SW1. The second row represents the voltage on the second switching node SW2. The third row represents the highs-side gate drive signal HSON1 of the first phase. The fourth row represents the highs-side gate drive signal HSON2 of the second phase. The fifth row represents the voltage on the node Vramp shown in FIG. 15. The sixth row represents the voltage on the node Va shown in FIG. 15. The seventh row represents the set signal generated by the ramp generator 205.

Referring back to FIG. 15, two resistor-capacitor-diode (RCD) circuits are added. A first RCD circuit includes the first diode D1, the first ramp capacitor $C_{TOP1B}$ and the first ramp resistor $R_{RAMP1B}$. A second RCD circuit includes the second diode D2, the second ramp capacitor $C_{TOP2B}$ and the second ramp resistor $R_{RAMP2B}$.

In response to a step change (e.g., the rise edge of HSON1 or HSON2), the Vramp voltage is generated. The Vramp voltage is discharged slowly through the resistors. This effectively adds another triangular ramp on Vramp. This enables stable operation when the duty cycle is close to 50%. When the duty cycle is close to 50%, the output voltage ripple is the smallest. As such, the triangular ramp does not need to be big because the output voltage ripple is quite small.

At t1, in response to the rising edge of HSON2, a ramp having a sharp slope is generated by the second RCD circuit. As shown in FIG. 16, Vramp increases sharply in a linear manner from t1 to t2. From t2 to t3, Vramp is discharged slowly. At t3, in response to the rising edge of HSON1, a ramp having a sharp slope is generated by the first RCD circuit. As shown in FIG. 16, Vramp increases sharply in a linear manner from t3 to t4. From t4, Vramp is discharged slowly. The waveforms of Va and SET in FIG. 16 are similar to Va and SET shown in FIG. 4, and hence are not discussed again herein.

Figure 17:
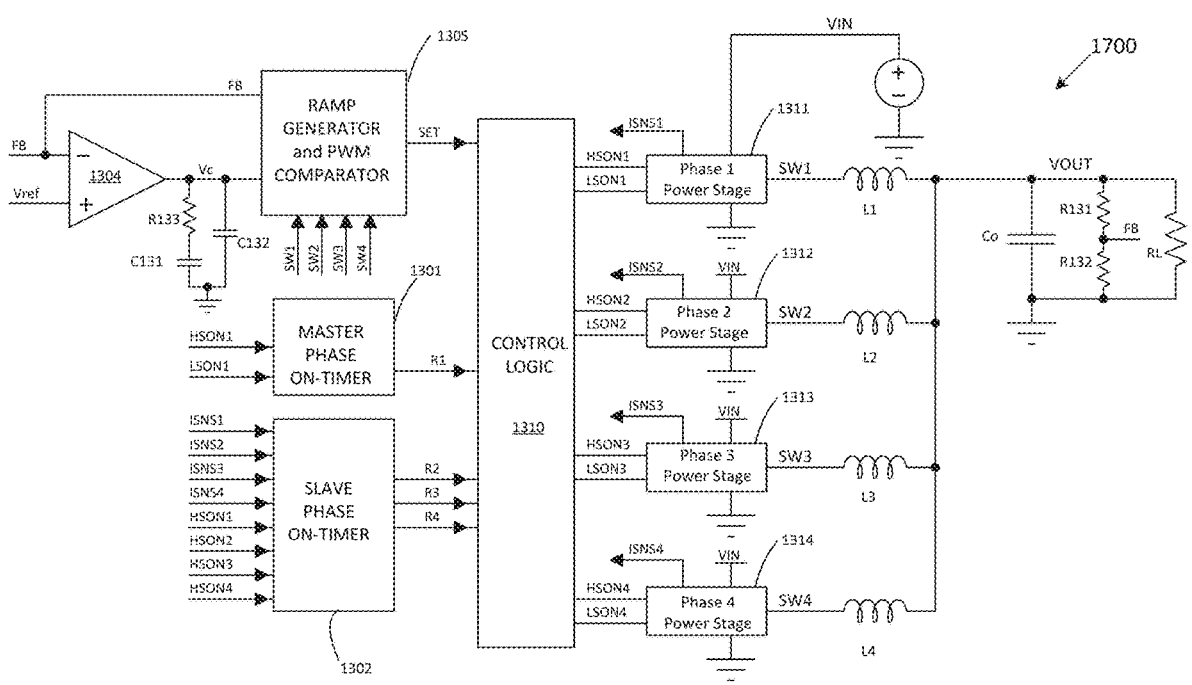
FIG. 17 illustrates a schematic diagram of a four-phase constant on-time power converter in accordance with various embodiments of the present disclosure.

FIG. 17 illustrates a schematic diagram of a four-phase constant on-time power converter in accordance with various embodiments of the present disclosure. The four-phase constant on-time power converter 1700 comprises a first buck converter, a second buck converter, a third buck converter and a fourth buck converter. The first buck converter is a first step-down converter comprising a first power stage 1311 and a first inductor L1. The second buck converter is a second step-down converter comprising a second power stage 1312 and a second inductor L2. The third buck converter is a third step-down converter comprising a third power stage 1313 and a third inductor L3. The fourth buck converter is a fourth step-down converter comprising a fourth power stage 1314 and a fourth inductor L4. Each power stage comprises a high-side switch and a low-side switch connected in series. The structure of the buck converter shown in FIG. 17 is similar to the structure of the buck converter shown in FIG. 2.

These four buck converters are connected in parallel between an input power source VIN and an output VOUT. As shown in FIG. 17, the output inductor L1 of the first step-down converter, the output inductor L2 of the second step-down converter, the output inductor L3 of the third step-down converter and the output inductor L4 of the fourth step-down converter are connected together and further connected to a load RL.

The control circuit of the four-phase constant on-time power converter 1700 comprises an error amplifier 1304, a ramp generator/PWM comparator 1305, a master phase on-timer 1301, a slave phase on-timer 1302 and a control logic block 1310.

As shown in FIG. 17, the inverting input of the error amplifier 1304 is employed to detect the output voltage VOUT through a voltage divider formed by resistors R131 and R132. The signal fed into the inverting input of the error amplifier 1304 is a feedback signal FB. The non-inverting input of the error amplifier 1304 is connected to a predetermined reference VREF. The output of the error amplifier 1304 is fed into the ramp generator 1305.

A compensation network is connected between the output of the error amplifier 1304 and ground. The compensation network comprises resistor R133, capacitor C131 and capacitor C132. The resistor R133 and the capacitor C131 are connected in series and further connected in parallel with the capacitor C132. The compensation network helps to stabilize the control loop and provide sufficient phase margin, thereby improving the transient response performance of the four-phase constant on-time power converter 1700.

The ramp generator 1305 is configured to receive the feedback signal FB, the output signal (Vc) of the error amplifier 1304, a voltage signal (SW1) on the switching node of the first buck converter, a voltage signal (SW2) on the switching node of the second buck converter, a voltage signal (SW3) on the switching node of the third buck converter and a voltage signal (SW4) on the switching node of the fourth buck converter. Based on the received signals, the ramp generator 1305 is configured to produce a set signal SET for determining a phase shift between different phases of the four-phase constant on-time power converter 1700. The operating principle of the ramp generator 1305 is similar to that of the ramp generator 205 shown in FIG. 2, and hence is not discussed again herein.

The master phase on-timer 1301 is configured to receive the highs-side gate drive signal HSON1 and the low-side gate drive signal LSON1 of the first buck converter. Based on the received signals, the master phase on-timer 1301 is configured to produce a first reset signal R1 for determining a turn-on time of the high-side switch of the first phase of the four-phase constant on-time power converter 1700. The operating principle of the master phase on-timer 1301 is similar to that of the master phase on-timer 201 shown in FIG. 2, and hence is not discussed again herein.

The slave phase on-timer 1302 is configured to receive signals ISNS1, ISNS2, ISNS3, ISNS4, the highs-side gate drive signal HSON1 of the first phase, the highs-side gate drive signal HSON2 of the second phase, the highs-side gate drive signal HSON3 of the third phase and the highs-side gate drive signal HSON4 of the fourth phase.

ISNS1 is a signal representative of the current flowing through the high-side switch of the first buck converter. ISNS2 is a signal representative of the current flowing through the high-side switch of the second buck converter. ISNS3 is a signal representative of the current flowing through the high-side switch of the third buck converter. ISNS4 is a signal representative of the current flowing through the high-side switch of the fourth buck converter. Based on the received signals, the slave phase on-timer 1302 is configured to produce reset signals R2, R3 and R4. R2 is used for determining a turn-on time of the high-side switch of the second phase of the four-phase constant on-time power converter 1700. R3 is used for determining a turn-on time of the high-side switch of the third phase of the four-phase constant on-time power converter 1700. R4 is used for determining a turn-on time of the high-side switch of the fourth phase of the four-phase constant on-time power converter 1700. The operating principle of the slave phase on-timer 1302 is similar to that of the slave phase on-timer 202 shown in FIG. 2, and hence is not discussed again herein.

The control logic block 1310 is configured to receive signals SET, R1, R2, R3 and R4. Based on the received signals, the control logic block 1310 is configured to generate gate drive signals for the four phases of the four-phase constant on-time power converter 1700. The operating principle of the control logic block 1310 is similar to that of the control logic block 210 shown in FIG. 2, and hence is not discussed again herein.

It should be noted that the four-phase constant on-time power converter used in the previous example is selected purely for demonstration purposes and are not intended to limit the various embodiments of the present disclosure to any particular phase numbers. One of ordinary skill in the art would recognize many variations, alternatives, and modifications. For example, the control circuit described above with respect to FIGS. 2-16 may be applicable to any multi-phase power converters (e.g., six-phase power converters, eight-phase power converters and the like).

It should further be noted that the control schemes and the associated circuits described above with respect to FIG. 2 are also applicable to the four-phase constant on-time power converter 1700. For example, each phase of the four-phase constant on-time power converter 1700 may operate with a duty cycle greater than 50%. Under this system configuration, the control scheme of the second phase on-timer (slave on-timer) shown in FIG. 12 may be adopted to generate the reset signals R2, R3 and R4. Furthermore, each phase of the four-phase constant on-time power converter 1700 may operate with a duty cycle close to 50%. Under this system configuration, the control scheme of the ramp generator shown in FIG. 15 may be employed to generate the set signal.

Figure 18:
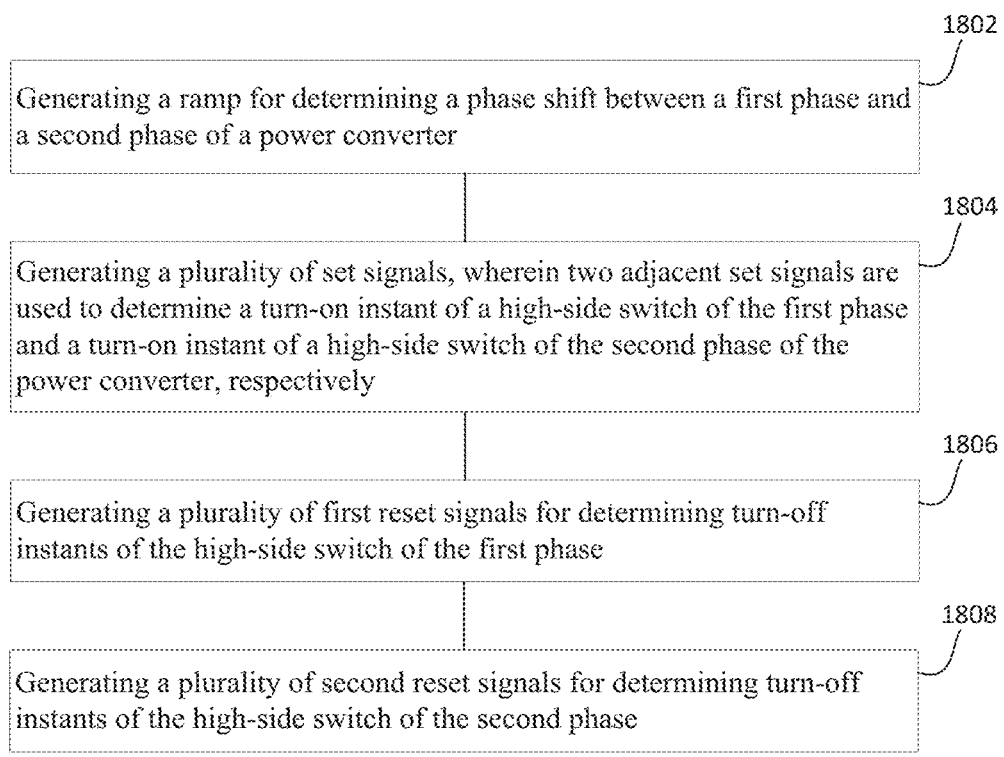
FIG. 18 illustrates a flow chart of a method for controlling the dual-phase constant on-time power converter shown in FIG. 2 in accordance with various embodiments of the present disclosure.

FIG. 18 illustrates a flow chart of a method for controlling the dual-phase constant on-time power converter shown in FIG. 2 in accordance with various embodiments of the present disclosure. This flowchart shown in FIG. 18 is merely an example, which should not unduly limit the scope of the claims. One of ordinary skill in the art would recognize many variations, alternatives, and modifications. For example, various steps illustrated in FIG. 18 may be added, removed, replaced, rearranged and repeated.

Referring back to FIG. 2, a power converter (e.g., the dual-phase constant on-time power converter 200) comprises a first buck converter and a second buck converter connected in parallel between an input power source and a load. The first buck converter is a first phase of the power converter. The second buck converter is a second phase of the power converter. The control circuit of the power converter comprises an error amplifier, a ramp generator, a master phase on-timer, a slave phase on-timer and a control logic block.

At step 1802, a ramp is generated for determining a phase shift between the first phase and the second phase of the power converter.

At step 1804, a plurality of set signals is generated based on the ramp. Two adjacent set signals are used to determine a turn-on instant of a high-side switch of the first phase and a turn-on instant of a high-side switch of the second phase of the power converter, respectively.

At step 1806, a plurality of first reset signals is generated by the master on-timer. The plurality of first reset signals is used for determining turn-off instants of the high-side switch of the first phase.

At step 1808, a plurality of second reset signals is generated by the slave on-timer. The plurality of second reset signals is used for determining turn-off instants of the high-side switch of the second phase.

The method further comprises generating a first current sense signal proportional to a current flowing through a high-side switch of the first phase, and generating a second current sense signal proportional to a current flowing through a high-side switch of the second phase, wherein the first current sense signal and the second current sense signal are used to generate the plurality of second reset signals.

The method further comprises generating an error signal using an error amplifier having a first input connected to a predetermined reference and a second input configured to receive a feedback signal proportional to an output voltage of the power converter, wherein the error signal and the feedback signal are used to the plurality of set signals.

Generating the plurality of set signals comprises converting the ramp into a first current, converting a difference between an error signal and a feedback signal into a second current, feeding a combination of the first current and the second current into a resistor to generate a triangular waveform and comparing the triangular waveform with a predetermined reference to generate the plurality of set signals.

The method further comprises during a step-up load transient, expanding at least one set signal of the plurality of set signals so as to configure a high-side switch of the first phase and a high-side switch of the second phase to be turned on simultaneously.

The method further comprises during a step-down load transient, skipping at least one set signal of the plurality of set signals so as to configure the first phase and the second phase to be off simultaneously.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
   an error amplifier having a first input configured to receive a feedback signal and a second input configured to receive a predetermined reference signal;
   a ramp generator configured to receive the feedback signal, an output signal of the error amplifier, a first switching node signal and a second switching node signal, and generate a set signal;
   a first phase on-timer configured to receive a first high side gate drive signal, a first low side gate drive signal, and generate a first reset signal based on the received signals by the first phase on-timer;
   a second phase on-timer configured to receive a first current signal, a second current signal, the first high side gate drive signal, a second high side gate drive signal, and generate a second reset signal based on the received signals by the second phase on-timer; and
   a control logic block configured to receive the set signal, the first reset signal and the second reset signal, and generate a plurality of gate drive signals.

2. The apparatus of claim 1, wherein the plurality of gate drive signals are used to control a dual-phase power converter comprising a first phase comprising a first step-down converter and a second phase comprising a second step-down converter, and wherein an output inductor of the first step-down converter and an output inductor of the second step-down converter are connected together and further connected to a load.

3. The apparatus of claim 2, wherein:
   the first switching node signal is tapped from a common node of a high side switch and a low side switch of the first step-down converter; and
   the second switching node signal is tapped from a common node of a high side switch and a low side switch of the second step-down converter.

4. The apparatus of claim 2, wherein the plurality of gate drive signals comprises:
   the first high side gate drive signal applied to a high side switch of the first step-down converter;
   the first low side gate drive signal applied to a low side switch of the first step-down converter;
   the second high side gate drive signal applied to a high side switch of the second step-down converter; and
   a second low side gate drive signal applied to a low side switch of the second step-down converter.

5. The apparatus of claim 4, wherein:
   the first current signal represents a current flowing through the high side switch of the first step-down converter; and
   the second current signal represents a current flowing through the high side switch of the second step-down converter.

6. The apparatus of claim 2, wherein:
   the first reset signal is configured to determine a turn-on time of a high-side switch of the first step-down converter; and
   the second reset signal is configured to determine a turn-on time of a high-side switch of the second step-down converter.

7. The apparatus of claim 2, wherein:
   the set signal is configured to determining a phase shift between the first step-down converter and the second step-down converter.

8. The apparatus of claim 1, further comprising:
   a compensation network coupled between an output of the error amplifier and ground, wherein the compensation network comprises a first compensation capacitor, a second compensation capacitor and a compensation resistor, and wherein:
   the first compensation capacitor and the compensation resistor are connected in series between the output of the error amplifier and ground; and
   the second compensation capacitor is connected between the output of the error amplifier and ground.

9. The apparatus of claim 1, further comprising:
   a resistor divider connected between an output of a dual-phase power converter and ground, wherein the resistor divider comprises a first divider resistor and a second divider resistor connected in series, and wherein the feedback signal is tapped at a common node of the first divider resistor and the second divider resistor.

10. The apparatus of claim 1, wherein the ramp generator comprises a first transconductance amplifier, a second transconductance amplifier and a comparator, and wherein:
    a non-inverting input of the first transconductance amplifier is connected to an output of a ramp circuit;
    an inverting input of the first transconductance amplifier is connected to ground;

a non-inverting input of the second transconductance amplifier is configured to receive the feedback signal;

an inverting input of the second transconductance amplifier is configured to receive the output signal generated by the error amplifier;

an output of the first transconductance amplifier and an output of the second transconductance amplifier are connected together and further connected to ground through a resistor;

an inverting input of the comparator is connected to the output of the first transconductance amplifier;

a non-inverting input of the comparator is connected to ground; and the comparator is configured to generate the set signal.

11. The apparatus of claim 10, wherein the ramp circuit further comprises:

a first ramp resistor and a first ramp capacitor connected in series between a first switching node of a first phase of a dual-phase power converter and the non-inverting input of the first transconductance amplifier;

a second ramp resistor and a second ramp capacitor connected in series between a second switching node of a second phase of the dual-phase power converter and the non-inverting input of the first transconductance amplifier; and a third ramp capacitor and a third ramp resistor connected in parallel between the non-inverting input of the first transconductance amplifier and ground.

12. The apparatus of claim 1, wherein the control logic block comprises:

a first latch circuit having a clock input configured to receive the set signal, and a data input and a Q-bar output connected together;

a first AND gate having a first input configured to receive the set signal, and a second input connected to a Q output of the first latch circuit;

a second AND gate having a first input connected to the Q-bar output of the first latch circuit, and a second input configured to receive the set signal;

a first delay block having an input configured to receive the second high side gate drive signal;

a second delay block having an input configured to receive the first high side gate drive signal;

a third AND gate having a first input connected to an output of the first delay block, and a second input configured to receive the set signal;

a fourth AND gate having a first input configured to receive the set signal, and a second input connected to an output of the second delay block;

a first OR gate having a first input connected to an output of the first AND gate, and a second input connected to an output of the third AND gate;

a second OR gate having a first input connected to an output of the fourth AND gate, and a second input connected to an output of the second AND gate;

a second latch circuit having a set input connected to an output of the first OR gate, a reset input configured to receive the first reset signal, a Q output configured to generate the first high side gate drive signal, and a Q-bar output configured to generate the first low side gate drive signal; and a third latch circuit having a set input connected to an output of the second OR gate, a reset input configured to receive the second reset signal, a Q output configured to generate the second high side gate drive signal, and a Q-bar output configured to generate a second low side gate drive signal.

13. The apparatus of claim 1, wherein the first phase on-timer comprises a first current source, a first capacitor, a switch and a comparator, and wherein:

the first current source and the first capacitor are connected in series between an input power source and ground, and wherein a current flowing through the first current source is proportional to an input voltage of the input power source;

the switch and the first capacitor are connected in parallel, and wherein a gate of the switch is controlled by the first low side gate drive signal; and a comparator having a non-inverting input connected to a common node of the first current source and the first capacitor, an inverting input configured to receive a reference voltage equal to a product of the input voltage of the input power source and a duty cycle of a dual-phase power converter, and an output configured to generate the first reset signal.

14. The apparatus of claim 1, wherein the second phase on-timer comprises:

a comparator having an inverting input configured to receive a first signal representative of a current flowing through a high-side switch of a first phase of a dual-phase power converter, a non-inverting input configured to receive a second signal representative of a current flowing through a high-side switch of a second phase of the dual-phase power converter, and an output configured to generate the second reset signal.

15. The apparatus of claim 14, wherein the second phase on-timer further comprises:

a first sensed current source, a first control switch and a second control switch connected in series between a bias voltage source and ground, and wherein a gate of the first control switch is controlled by the first high side gate drive signal, and a gate of the second control switch is controlled by the second reset signal, and wherein a current flowing through the first sensed current source is proportional to the current flowing through the high-side switch of the first phase of the dual-phase power converter;

a first capacitor connected in parallel with the second control switch, and wherein the first signal representative of the current flowing through the high-side switch of the first phase of the dual-phase power converter is tapped at a common node of the first control switch and the second control switch;

a second sensed current source and a third control switch connected in series between the bias voltage source and ground, and wherein a gate of the third control switch is controlled by an inverse signal of the second high side gate drive signal, and wherein a current flowing through the second sensed current source is proportional to the current flowing through the high-side switch of the second phase of the dual-phase power converter; and a second capacitor connected in parallel with the third control switch, and wherein the second signal representative of the current flowing through the high-side switch of the second phase of the dual-phase power converter is tapped at a common node of the second sensed current source and the third control switch.

16. A system comprising:

a first phase comprise a first high side switch and a first low side switch connected in series, and a first inductor connected to a common node of the first high side switch and the first low side switch, and an output of the system;

a second phase comprise a second high side switch and a second low side switch connected in series, and a second inductor connected to a common node of the second high side switch and the second low side switch, and the output of the system; and
a control circuit comprising:
an error amplifier having a first input configured to receive a feedback signal and a second input configured to receive a predetermined reference signal;
a ramp generator configured to receive the feedback signal, an output signal of the error amplifier, a first switching node signal and a second switching node signal, and generate a set signal;
a first phase on-timer configured to receive a first high side gate drive signal applied to the first high side switch, a first low side gate drive signal applied to the first low side switch, and generate a first reset signal based on the received signals by the first phase on-timer;
a second phase on-timer configured to receive a first current signal proportional to a current flowing through the first high side switch, a second current signal proportional to a current flowing through the second high side switch, the first high side gate drive signal, a second high side gate drive signal applied to the second high side switch, and generate a second reset signal based on the received signals by the second phase on-timer; and
a control logic block configured to receive the set signal, the first reset signal and the second reset signal, and generate a plurality of gate drive signals.

17. The system of claim 16, wherein:
the first switching node signal is tapped from a common node of the first high side switch and the first low side switch;
the second switching node signal is tapped from a common node of the second high side switch and the second low side switch;
the first reset signal is configured to determine a turn-on time of the first high side switch;
the second reset signal is configured to determine a turn-on time of the second high side switch; and
the set signal is configured to determine a phase shift between a first phase and a second phase of the system.

18. The system of claim 16, wherein the ramp generator comprises a first transconductance amplifier, a second transconductance amplifier, a comparator, a first ramp resistor, a first ramp capacitor, a second ramp resistor, a second ramp capacitor, a third ramp capacitor and a third ramp resistor, and wherein:
a non-inverting input of the first transconductance amplifier is connected to an output of a ramp circuit;
an inverting input of the first transconductance amplifier is connected to ground;
a non-inverting input of the second transconductance amplifier is configured to receive the feedback signal;
an inverting input of the second transconductance amplifier is configured to receive the output signal generated by the error amplifier;
an output of the first transconductance amplifier and an output of the second transconductance amplifier are connected together and further connected to ground through a resistor;
an inverting input of the comparator is connected to the output of the first transconductance amplifier;
a non-inverting input of the comparator is connected to ground;
the comparator is configured to generate the set signal;
the first ramp resistor and the first ramp capacitor are connected in series between a first switching node of the first phase and the non-inverting input of the first transconductance amplifier;
the second ramp resistor and the second ramp capacitor are connected in series between a second switching node of the second phase and the non-inverting input of the first transconductance amplifier; and
the third ramp capacitor and the third ramp resistor are connected in parallel between the non-inverting input of the first transconductance amplifier and ground.

19. The system of claim 16, wherein the control logic block comprises:
a first latch circuit having a clock input configured to receive the set signal, and a data input and a Q-bar output connected together;
a first AND gate having a first input configured to receive the set signal, and a second input connected to a Q output of the first latch circuit;
a second AND gate having a first input connected to the Q-bar output of the first latch circuit, and a second input configured to receive the set signal;
a first delay block having an input configured to receive the second high side gate drive signal;
a second delay block having an input configured to receive the first high side gate drive signal;
a third AND gate having a first input connected to an output of the first delay block, and a second input configured to receive the set signal;
a fourth AND gate having a first input configured to receive the set signal, and a second input connected to an output of the second delay block;
a first OR gate having a first input connected to an output of the first AND gate, and a second input connected to an output of the third AND gate;
a second OR gate having a first input connected to an output of the fourth AND gate, and a second input connected to an output of the second AND gate;
a second latch circuit having a set input connected to an output of the first OR gate, a reset input configured to receive the first reset signal, a Q output configured to generate the first high side gate drive signal, and a Q-bar output configured to generate the first low side gate drive signal; and
a third latch circuit having a set input connected to an output of the second OR gate, a reset input configured to receive the second reset signal, a Q output configured to generate the second high side gate drive signal, and a Q-bar output configured to generate a second low side gate drive signal.

20. The system of claim 16, wherein:
the first phase on-timer comprises a first current source, a first capacitor, a switch and a comparator, and wherein:
the first current source and the first capacitor are connected in series between an input power source and ground, and wherein a current flowing through the first current source is proportional to an input voltage of the input power source;
the switch of the first phase on-timer and the first capacitor are connected in parallel, and wherein a gate of the switch is controlled by the first low side gate drive signal; and
a comparator having a non-inverting input connected to a common node of the first current source and the first capacitor, an inverting input configured to receive a reference voltage equal to a product of the input voltage of the input power source and a duty cycle of a dual-phase power converter comprising the first phase and the second phase, and an output configured to generate the first reset signal; and the second phase on-timer comprises:

a comparator having an inverting input configured to receive a first signal representative of a current flowing through the first high-side switch of the first phase of the system, a non-inverting input configured to receive a second signal representative of a current flowing through the second high-side switch of the second phase of the system, and an output configured to generate the second reset signal;

a first sensed current source, a first control switch and a second control switch connected in series between a bias voltage source and ground, and wherein a gate of the first control switch is controlled by the first high side gate drive signal, and a gate of the second control switch is controlled by the second reset signal, and wherein a current flowing through the first sensed current source is proportional to the current flowing through the first high-side switch of the first phase of the system;

a first capacitor connected in parallel with the second control switch, and wherein the first signal representative of the current flowing through the first high-side switch of the first phase of the system is tapped at a common node of the first control switch and the second control switch;

a second sensed current source and a third control switch connected in series between the bias voltage source and ground, and wherein a gate of the third control switch is controlled by an inverse signal of the second high side gate drive signal, and wherein a current flowing through the second sensed current source is proportional to the current flowing through the second high-side switch of the second phase of the system; and a second capacitor connected in parallel with the third control switch, and wherein the second signal representative of the current flowing through the second high-side switch of the second phase of the system is tapped at a common node of the second sensed current source and the third control switch.

* * * * *